(12) United States Patent
Yashima et al.

(10) Patent No.: US 12,520,031 B2
(45) Date of Patent: Jan. 6, 2026

(54) IMAGE CAPTURING APPARATUS CAPABLE OF SELECTING AN OBJECT TO BE FOCUSED, CONTROL METHOD THEREOF, AND STORAGE MEDIUM

(71) Applicant: CANON KABUSHIKI KAISHA, Tokyo (JP)

(72) Inventors: Hiroshi Yashima, Kanagawa (JP); Hideki Ogura, Kanagawa (JP); Kuniaki Sugitani, Kanagawa (JP); Yohei Matsui, Kanagawa (JP); Akihiko Kanda, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 100 days.

(21) Appl. No.: 18/408,106

(22) Filed: Jan. 9, 2024

(65) Prior Publication Data

US 2024/0236472 A1    Jul. 11, 2024

(30) Foreign Application Priority Data

Jan. 11, 2023    (JP) .................................. 2023-002558

(51) Int. Cl.
*H04N 23/611*    (2023.01)
*G06T 7/70*    (2017.01)
(Continued)

(52) U.S. Cl.
CPC ............. *H04N 23/611* (2023.01); *G06T 7/70* (2017.01); *G06V 20/50* (2022.01); *G06V 40/10* (2022.01);
(Continued)

(58) Field of Classification Search
CPC .... H04N 23/611; H04N 23/67; H04N 23/695; H04N 23/675; G06T 7/70;
(Continued)

(56) References Cited

U.S. PATENT DOCUMENTS 11,115,583 B2 *    9/2021 Kudo ................... H04N 23/672
2020/0120262 A1 *    4/2020 Kinoshita ............ H04N 23/611
(Continued)

FOREIGN PATENT DOCUMENTS

JP    2018-066889 A    4/2018
JP    2022-135552 A    9/2022

OTHER PUBLICATIONS

Cao, Zhe, et al., "Realtime multi-person 2d pose estimation using part affinity fields." Proceedings of the IEEE Conference on Computer Vision and Pattern Recognition, 2017 , pp. 1302-1310, vol. 1, DOI Bookmark:10.1109/CVPR.2017.143. Cited in Specification in paragraph [0052].

(Continued)

*Primary Examiner* — Gevell V Selby
(74) *Attorney, Agent, or Firm* — Cowan, Liebowitz & Latman, P.C.

(57) ABSTRACT

An image capturing apparatus includes an object detection unit configured to detect an object, a posture detection unit configured to detect a posture of the object, a focus detection unit configured to detect a focusing state of the object; and a setting unit configured to set a threshold value for determining whether or not to select the object as a main object based on a posture and the focusing state of the object.

16 Claims, 22 Drawing Sheets

(51) Int. Cl.
*G06V 20/50* (2022.01)
*G06V 40/10* (2022.01)
*G06V 40/20* (2022.01)
*H04N 23/67* (2023.01)
*H04N 23/695* (2023.01)

(52) U.S. Cl.
CPC ............ *G06V 40/20* (2022.01); *H04N 23/67* (2023.01); *G06T 2207/20081* (2013.01); *G06T 2207/20084* (2013.01); *G06T 2207/30201* (2013.01); *G06T 2207/30221* (2013.01); *H04N 23/695* (2023.01)

(58) Field of Classification Search
CPC . G06T 2207/20081; G06T 2207/20084; G06T 2207/30201; G06T 2207/30221; G06V 20/50; G06V 40/10; G06V 40/20
See application file for complete search history.

(56) References Cited

U.S. PATENT DOCUMENTS

| | | | |
|---|---|---|---|
| 2021/0127068 A1* | 4/2021 | Nishiyama | H04N 23/611 |
| 2022/0321792 A1* | 10/2022 | Nishiyama | H04N 23/611 |
| 2023/0177860 A1* | 6/2023 | Hasegawa | G06V 10/74 |
| | | | 382/100 |

OTHER PUBLICATIONS

Redmon, Joseph, et al., "You only look once: Unified, real-time object detection.", Proceedings of the IEEE conference on computer vision and pattern recognition, 2016, pp. 779-788, vol. 1, DOI Bookmark:10.1109/CVPR.2016.91. Cited in Specification in paragraph [0122].

* cited by examiner

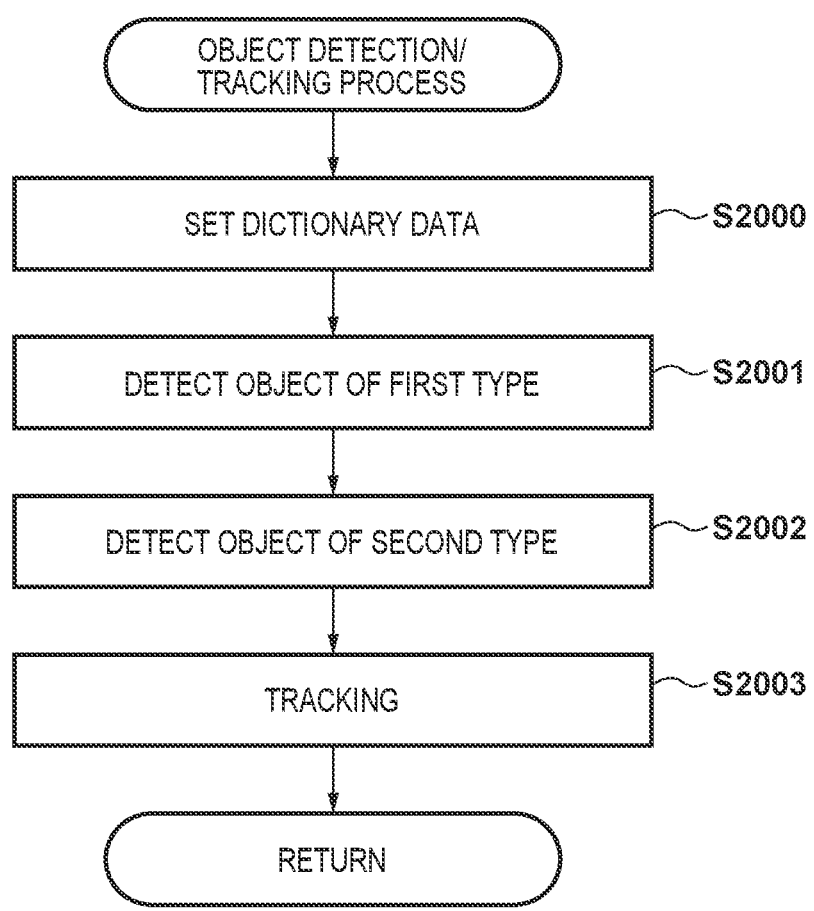

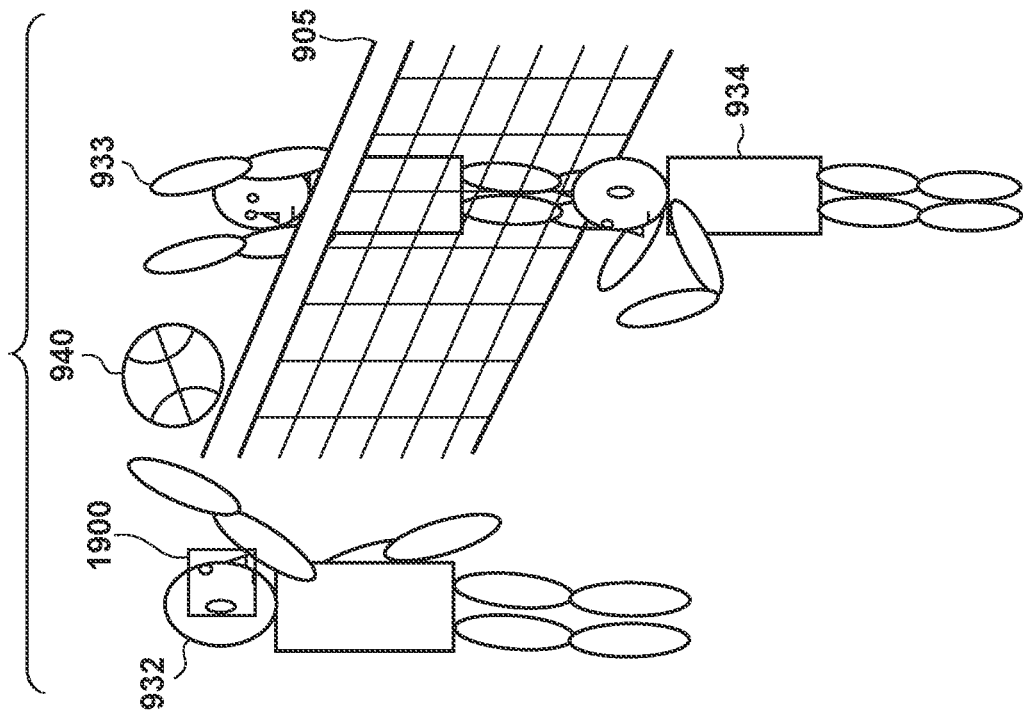
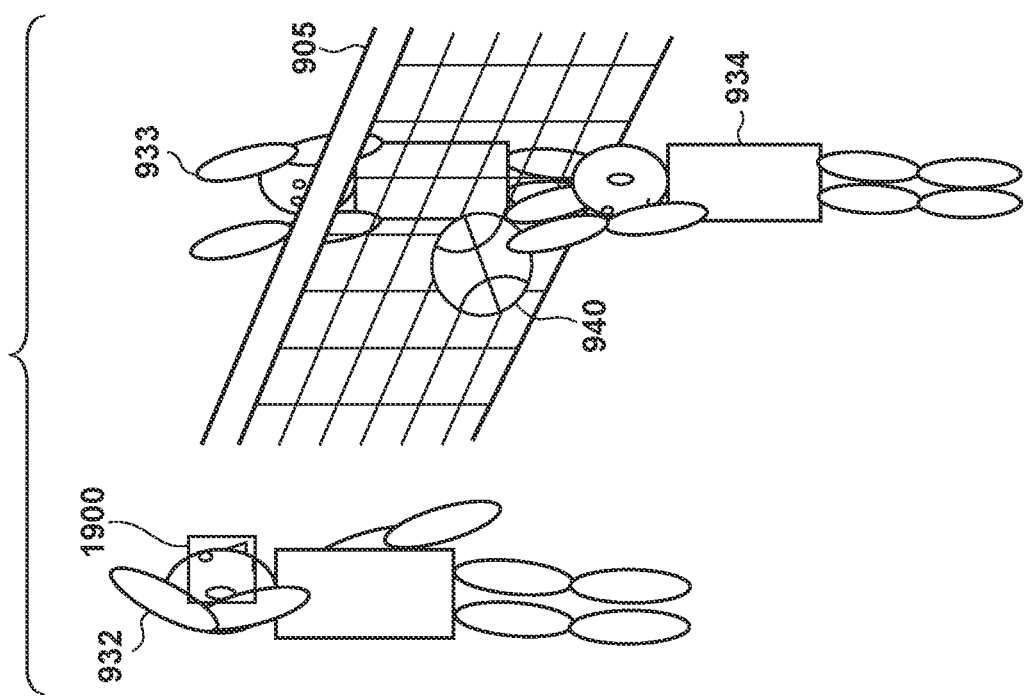

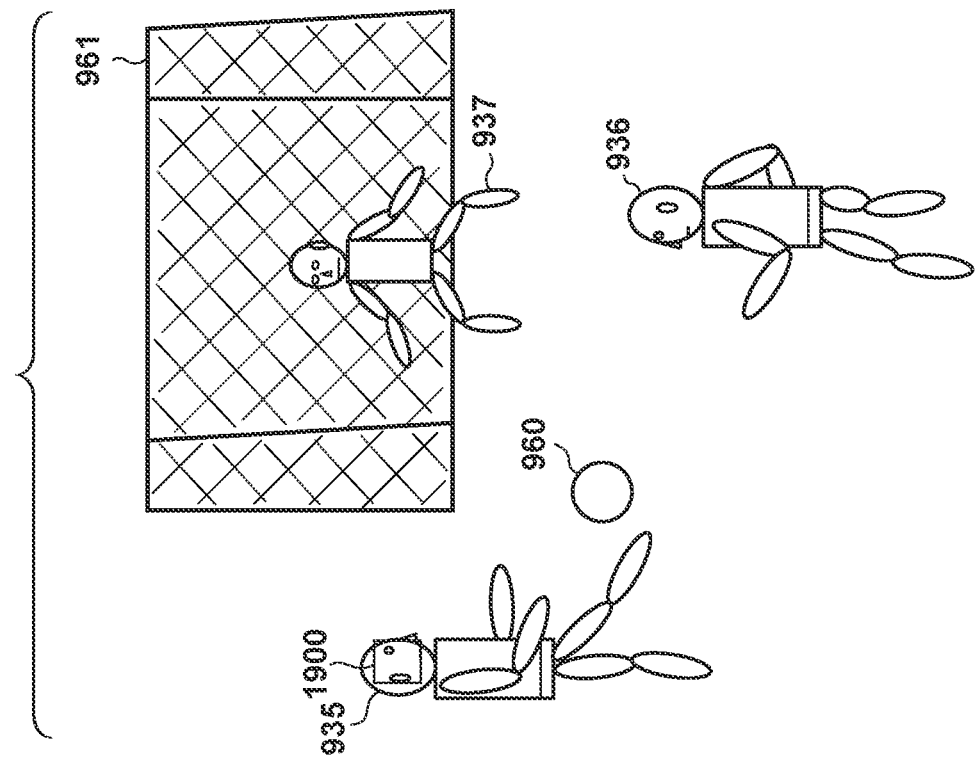
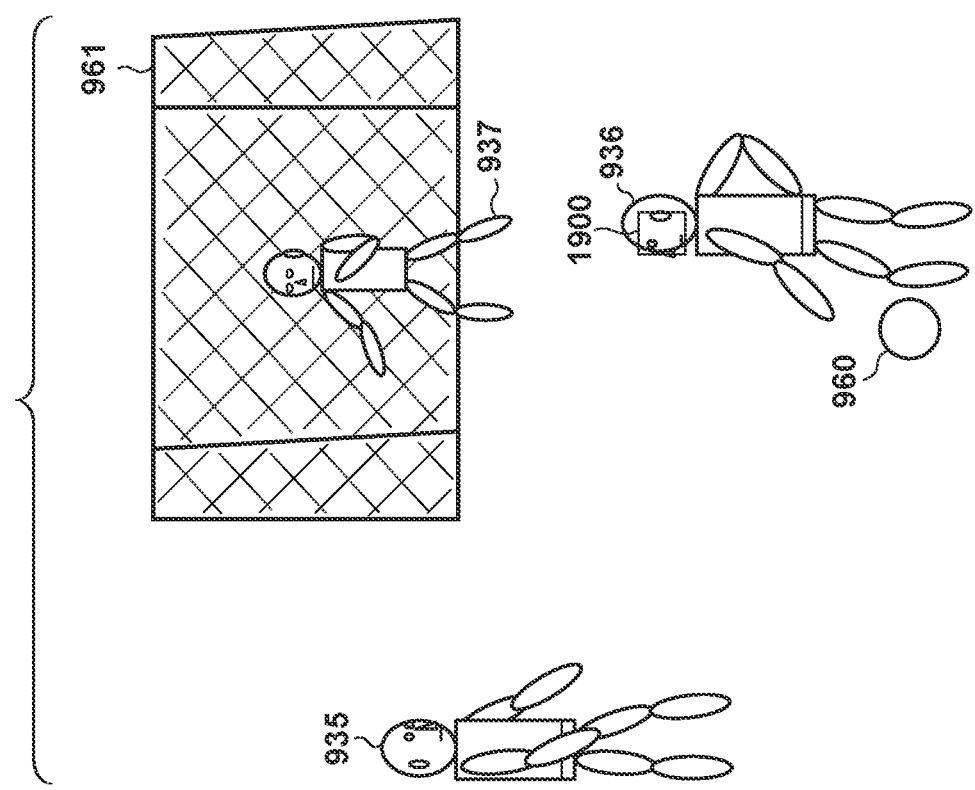

IMAGE CAPTURING APPARATUS CAPABLE OF SELECTING AN OBJECT TO BE FOCUSED, CONTROL METHOD THEREOF, AND STORAGE MEDIUM

BACKGROUND OF THE INVENTION

Field of the Invention

The present invention relates to an image capturing apparatus.

Description of the Related Art

In a case where a plurality of moving objects detected by an image capturing apparatus are photographed in continuous photographing in which a plurality of photographing is continuously performed, it is necessary to determine a main object from the plurality of objects and keep focusing on the main object. As a method of determining the main object, a method of detecting two different types of objects, determining the main object, and adjusting the focus is disclosed in Japanese Patent Laid-Open No. 2018-66889.

However, as disclosed in Japanese Patent Laid-Open No. 2018-66889, when the main object is determined from the positional relationship between two different types of objects, an object different from the photographer's intention may be determined as the main object, and focusing may be continued. In addition, there is also a case where the focus position suddenly changes when the main object is replaced.

SUMMARY OF THE INVENTION

The present invention has been made in view of the above-described problems, and provides an image capturing apparatus that can appropriately select an object to be focused in a case where a plurality of objects exist.

According to a first aspect of the present invention, there is provided an image capturing apparatus comprising at least one processor or circuit configured to function as: an object detection unit configured to detect an object; a posture detection unit configured to detect a posture of the object; a focus detection unit configured to detect a focusing state of the object; and a setting unit configured to set a threshold value for determining whether or not to select the object as a main object based on a posture and the focusing state of the object.

According to a second aspect of the present invention, there is provided a method of controlling an image capturing apparatus, comprising: performing object detection for detecting an object; performing posture detection for detecting a posture of the object; performing focus detection for detecting a focusing state of the object: and setting a threshold value for determining whether or not to select the object as a main object based on a posture and the focusing state of the object.

Further features of the present invention will become apparent from the following description of exemplary embodiments with reference to the attached drawings.

BRIEF DESCRIPTION OF THE DRAWINGS

FIG. 14 is a flowchart explaining an object detection/tracking process in the embodiment.

FIG. 17A is a conceptual diagram describing a main object determination process in the embodiment.

FIG. 17B is a conceptual diagram describing the main object determination process in the embodiment.

FIG. 18A is a conceptual diagram describing a main object determination process in the embodiment.

FIG. 18B is a conceptual diagram describing the main object determination process in the embodiment.

DESCRIPTION OF THE EMBODIMENTS

Figure 1:
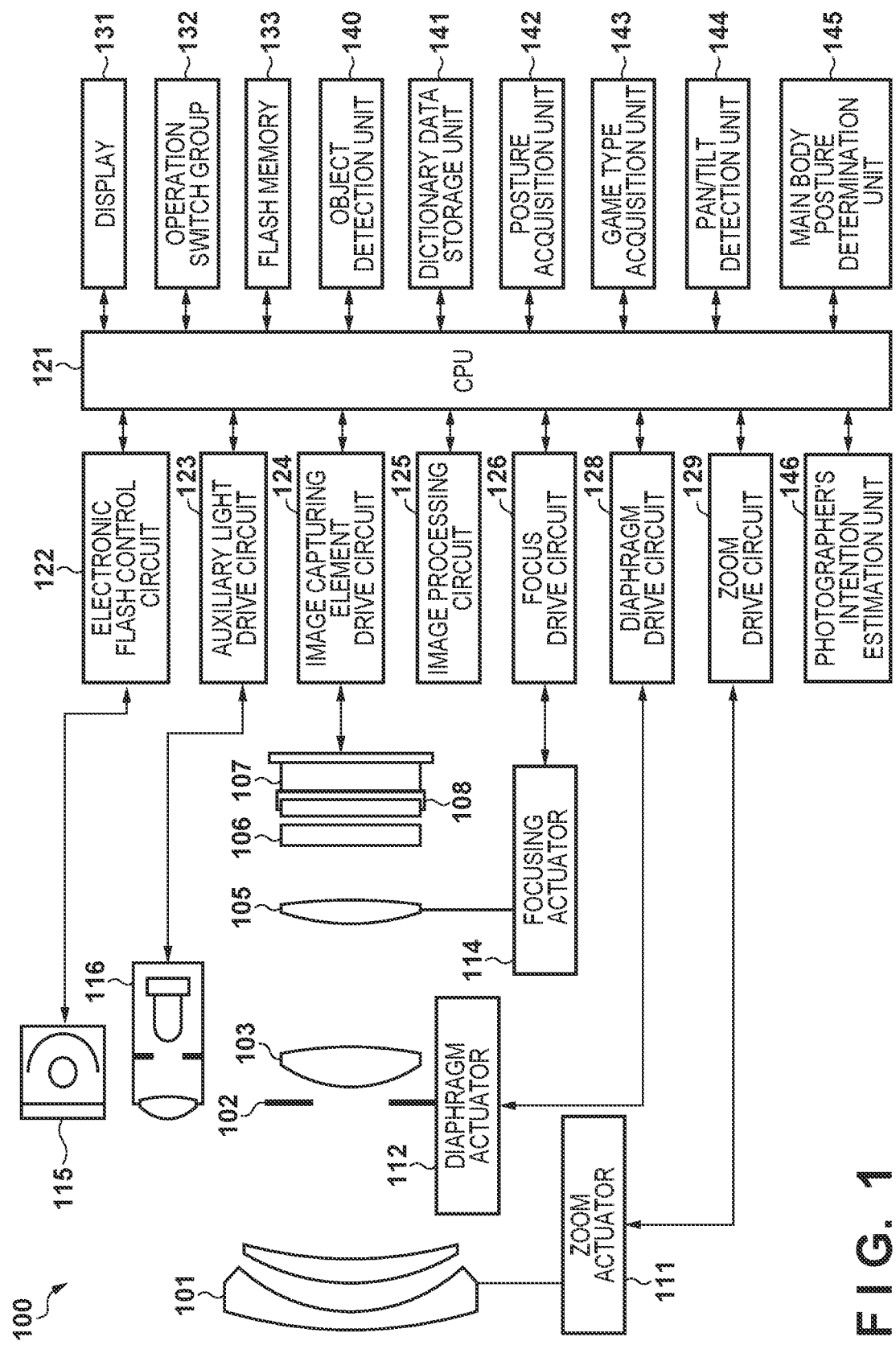
FIG. 1 is a block diagram illustrating a configuration of a camera, which is an embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a diagram illustrating a configuration of a digital camera (hereinafter, camera) 100 which is a first embodiment of an image capturing apparatus of the present invention.

In FIG. 1, a first lens group 101 is arranged on the most object side (front side) in an imaging optical system serving as an image forming optical system, and is held movable in an optical axis direction. A diaphragm 102 adjusts a light amount by adjusting an opening diameter thereof. A second lens group 103 moves in the optical axis direction integrally with the diaphragm 102, and performs magnification change (zoom) together with the first lens group 101 moving in the optical axis direction.

A third lens group (focus lens) 105 moves in the optical axis direction to perform focus adjustment. An optical low-pass filter 106 is an optical element for reducing false color and moire of a captured image. The first lens group 101, the diaphragm 102, the second lens group 103, the third lens group 105, and the optical low-pass filter 106 constitute an imaging optical system.

A zoom actuator 111 turns a cam barrel (not shown) about the optical axis to move the first lens group 101 and the second lens group 103 in the optical axis direction by a cam provided in the cam barrel, thereby performing magnification change. A diaphragm actuator 112 drives a plurality of light shielding blades (not shown) in an opening/closing direction for a light amount adjustment operation of the diaphragm 102. A focus actuator 114 moves the third lens group 105 in the optical axis direction to perform focus adjustment.

A focus drive circuit 126 serving as a focus adjustment means drives the focus actuator 114 in response to a focus drive command from the camera CPU 121 to move the third lens group 105 in the optical axis direction. A diaphragm drive circuit 128 drives the diaphragm actuator 112 in response to a diaphragm drive command from the camera CPU 121. A zoom drive circuit 129 drives the zoom actuator 111 in accordance with a zoom operation by the user.

Note that, in the present embodiment, a case where the imaging optical system, the actuators 111, 112, 114, and the drive circuits 126, 128, 129 are provided integrally with the camera main body including the image capturing element 107 will be described. However, an interchangeable lens including the imaging optical system, the actuators 111, 112, 114, and the drive circuits 126, 128, 129 may be detachable from the camera main body.

An electronic flash 115 includes a light emitting element such as a xenon tube or an LED, and emits light for illuminating an object. An AF (autofocus) auxiliary light emitting unit 116 includes a light emitting element such as an LED, and projects an image of a mask having a predetermined opening pattern to an object through a projection lens, thereby improving focus detection performance on an object having a dark or low contrast. An electronic flash control circuit 122 performs control to turn on the electronic flash 115 in synchronization with the imaging operation. An auxiliary light drive circuit 123 performs control to turn on the AF auxiliary light emitting unit 116 in synchronization with the focus detection operation.

The camera CPU 121 performs various types of control in the camera 100. The camera CPU 121 includes a calculation unit, a ROM, a RAM, an A/D converter, a D/A converter, a communication interface circuit, and the like. The camera CPU 121 drives various circuits in the camera 100 and controls a series of operations such as AF, imaging, image processing, and recording in accordance with a computer program stored in the ROM. The camera CPU 121 also functions as an image processing device.

The image capturing element 107 includes a two dimensional CMOS photosensor including a plurality of pixels and a peripheral circuit thereof, and is arranged on an image forming plane of the imaging optical system. The image capturing element 107 photoelectrically converts an object image formed by the imaging optical system. The image capturing element drive circuit 124 controls the operation of the image capturing element 107, performs A/D conversion on an analog signal generated by photoelectric conversion, and transmits a digital signal to the camera CPU 121.

The shutter 108 has a configuration of a focal plane shutter, and performs the drive of the focal plane shutter according to a command from a shutter drive circuit incorporated in the shutter 108 based on an instruction from the camera CPU 121. While the signal of the image capturing element 107 is being read out, the image capturing element 107 is shielded from light. Furthermore, when the exposure is performed, the focal plane shutter is opened, and the photographing light flux is guided to the image capturing element 107.

The image processing circuit 125 applies predetermined image processing on the image stored in the RAM in the camera CPU 121. The image processing applied by the image processing circuit 125 includes, but is not limited to, so-called development processing such as white balance adjustment processing, color interpolation (demosaic) processing, and gamma correction processing, signal format conversion processing, scaling processing, and the like. Furthermore, the image processing circuit 125 stores the processed image data, the joint position of each object, the position and size information of the unique object, the center of gravity of the object, the position information of the face and the pupil, and the like in the RAM in the camera CPU 121. The result of the determination process may be used for other image processing (e.g., white balance adjustment processing).

A display device (display means) 131 includes a display element such as an LCD, and displays information regarding an imaging mode of the camera 100, a preview image before imaging, a confirmation image after imaging, an index of a focus detection area, an in-focus image, and the like. An operation switch group 132 includes a main (power supply) switch, a release (photographing trigger) switch, a zoom operation switch, a photographing mode selection switch, and the like, and is operated by the user. The flash memory 133 records the captured image. The flash memory 133 is detachable from the camera 100.

An object detection unit 140 serving as an object detection means detects an object based on dictionary data generated by machine learning. In the present embodiment, the object detection unit 140 uses dictionary data for each object in order to detect a plurality of types of objects. Each dictionary data is, for example, data in which a feature of a corresponding object is registered. The object detection unit 140 performs object detection while sequentially switching dictionary data for each object. In the present embodiment, dictionary data for each object is stored in the dictionary data storage unit 141. Therefore, a plurality of dictionary data are stored in the dictionary data storage unit 141. The camera CPU 121 determines which one of the plurality of dictionary data is used to perform object detection based on the priority of the object set in advance and the setting of the image capturing apparatus. As the object detection, detection of a person and detection of organs such as a face, a pupil, and a trunk of the person are performed.

Furthermore, an object such as a ball other than a person is detected. The object detection unit 140 detects an object of a person object and an object of an object different from the person (examples: ball, goal ring, net).

A posture acquisition unit 142 serving as a posture detection means performs posture estimation on each of the plurality of objects detected by the object detection unit 140 and acquires posture information. The content of the posture information to be acquired is determined according to the type of the object. Here, since the object is a person, the posture acquisition unit 142 acquires the positions of a plurality of joints of the person as the object. Note that since the posture acquisition unit 142 can acquire the position of the joint of the person, action recognition for determining whether or not the person is performing an action involving a specific movement can be performed.

Note that any method may be used for the posture estimation method, and for example, the method described in Document 1 can be used. Details of the acquisition of the posture information will be described later.

(Patent Document 1)
Cao, Zhe, et al., "Realtime multi-person 2d pose estimation using part affinity fields.", Proceedings of the IEEE Conference on Computer Vision and Pattern Recognition, 2017, Pages: 1302-1310, Volume: 1, DOI Bookmark:10.1109/CVPR.2017.143.

The dictionary data storage unit 141 stores dictionary data for each object. The object detection unit 140 estimates the position of the object in the image based on the imaged image data and the dictionary data. The object detection unit 140 may estimate the position, size, reliability, or the like of the object and output the estimated information. The object detection unit 140 may output other information.

Examples of the dictionary data for object detection include, for example, dictionary data for detecting a "person", dictionary data for detecting an "animal", dictionary data for detecting a "vehicle", and dictionary data for detecting a ball as an object. Furthermore, dictionary data for detecting the "entire person" and dictionary data for detecting an organ such as the "face of a person" may be separately stored in the dictionary data storage unit 141.

In the present embodiment, the object detection unit 140 is configured by a machine-learned CNN, and estimates the position and the like of an object included in the image data. In the present embodiment, the object detection units 140 are configured by different convolutional neural networks (CNNs). The object detection unit 140 may be realized by a graphics processing unit (GPU) or a circuit specialized for estimation processing by a CNN.

The machine learning of the CNN may be performed with an arbitrary method. For example, a predetermined computer such as a server may perform machine learning of the CNN, and the camera 100 may acquire the learned CNN from the predetermined computer. For example, learning of the CNN of the object detection unit 140 may be performed by a predetermined computer performing supervised learning in which image data for learning serves as input and a position or the like of an object corresponding to the image data for learning serves as teacher data. As described above, the learned CNN is generated. Learning of the CNN may be performed by the camera 100 or the image processing device described above.

A game type acquisition unit 143 serving as a game detection means specifies the type of game performed by the person object from the information of the object detection unit 140, the dictionary data storage unit 141, and the posture acquisition unit 142. Note that the game type acquisition unit 143 may have a function of specifying (setting) the game type according to the intention of the photographer in advance.

A pan/tilt detection unit 144 is configured using a gyro sensor or the like, and detects a panning operation and a tilting operation of the camera. The main body posture determination unit 145 determines a series of camera operations performed by the photographer from the start to the end of the panning or tilting operation as the main body posture based on the output of the pan/tilt detection unit 144. The determination result is notified to the photographer's intention estimation unit 146.

The photographer's intention estimation unit 146 estimates the photographer's intention to photograph. The photographer's intention estimation unit 146 estimates whether or not the photographer intends to switch the main object based on the object information from the object detection unit 140, the information of the posture type (the above-described action recognition) from the posture acquisition unit 142, and the history information of the camera operation (panning or tilting operation) by the photographer from the main body posture determination unit 145. After the estimation result is sent to the camera CPU 121, it is used for focus drive control to the main object by each drive command from the camera CPU 121.

Figure 2:
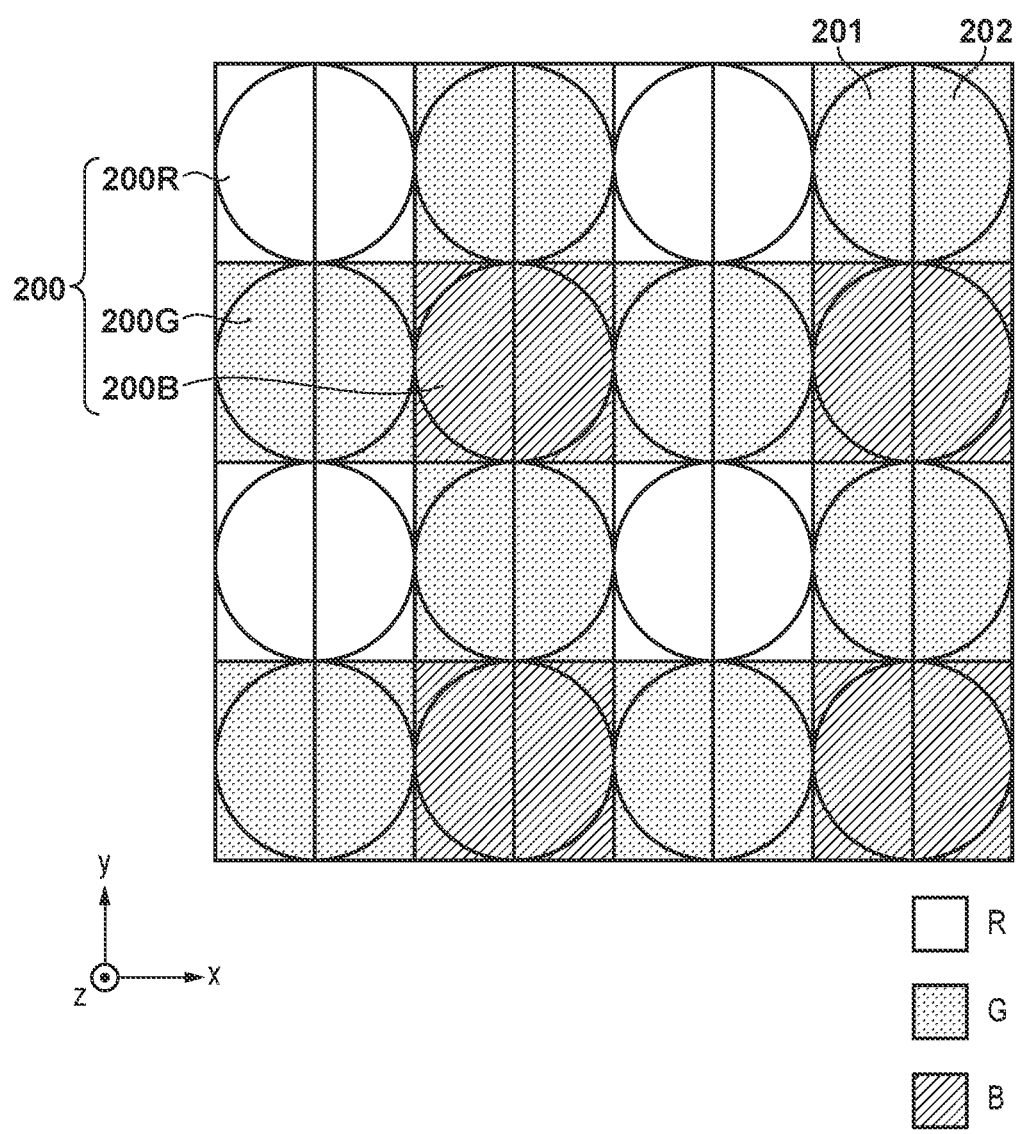
FIG. 2 is a diagram illustrating a pixel array in the camera according to the embodiment.

Next, an image array of the image capturing element 107 will be described with reference to FIG. 2. FIG. 2 illustrates a pixel array in a range of 4 pixel columns×4 pixel rows in the image capturing element 107 as viewed from the optical axis direction (z direction).

One pixel unit 200 includes four image forming pixels arranged in 2 rows×2 columns. A photoelectric conversion of a two dimensional object image can be performed by arranging a large number of pixel units 200 on the image capturing element 107. In one pixel unit 200, an image forming pixel (hereinafter referred to as an R pixel) 200R having spectral sensitivity of R (red) is arranged at the upper left, and an image forming pixel (hereinafter referred to as a G pixel) 200G having spectral sensitivity of G (green) is arranged at the upper right and the lower left. Furthermore, an image forming pixel (hereinafter, referred to as a B pixel) 200B having a spectral sensitivity of B (blue) is arranged at the lower right. Each image forming pixel includes a first focus detection pixel 201 and a second focus detection pixel 202 divided in the horizontal direction (x direction).

In the image capturing element 107 of the present embodiment, the pixel pitch P of the image forming pixels is 4 μm, and the number of image forming pixels N is 5575 columns in the horizontal direction (x)×3725 rows in the vertical direction (y)=about 20.75 million pixels. The pixel pitch PAF of the focus detection pixels is 2 μm, and the number of focus detection pixels NAF is 11150 columns in the horizontal direction×3725 rows in the vertical direction=about 41.5 million pixels.

In the present embodiment, a case where each image forming pixel is divided into two in the horizontal direction will be described, but each image forming pixel may be divided in the vertical direction. Furthermore, the image capturing element 107 of the present embodiment includes a plurality of image forming pixels each including first and second focus detection pixels, but the image forming pixels and the first and second focus detection pixels may be provided as separate pixels. For example, the first and second focus detection pixels may be discretely arranged in the plurality of image forming pixels.

Figure 3A:
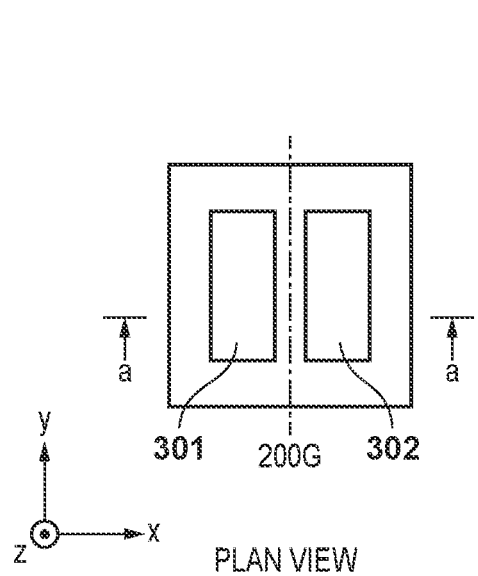
FIGS. 3A and 3B are a plan view and a cross-sectional view, respectively, of a pixel in the embodiment.
Figure 3B:
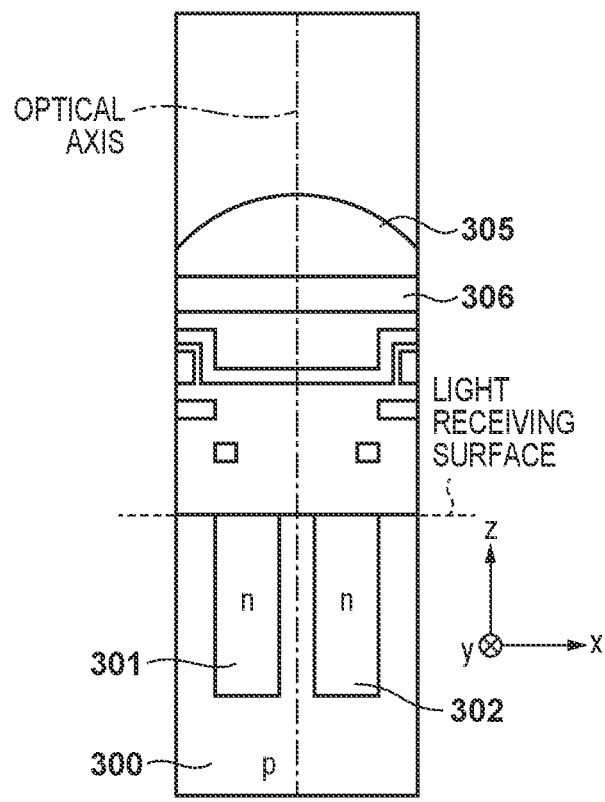

FIG. 3A illustrates one image forming pixel (200R, 200G, 200B) viewed from the light receiving surface side (+z direction) of the image capturing element 107. FIG. 3B illustrates an a-a cross section of the image forming pixel in FIG. 3A as viewed from the −y direction. As illustrated in FIG. 3B, one image forming pixel is provided with one microlens 305 for collecting incident light.

Furthermore, the image forming pixel is provided with a photoelectric conversion part 301, 302 divided into N (two in the present embodiment) in the x direction. Each of the photoelectric conversion parts 301, 302 corresponds to the first focus detection pixel 201 and the second focus detection pixel 202. The center of gravity of the photoelectric conversion part 301, 302 is decentered to the −x side and the +x side with respect to the optical axis of the microlens 305.

An R, G, or B color filter 306 is provided between the microlens 305 and the photoelectric conversion part 301, 302 in each image forming pixel. The spectral transmittance of the color filter may be changed for each photoelectric conversion part, or the color filter may be omitted.

Light entering from the imaging optical system into the image forming pixel is collected by the microlens 305, dispersed by the color filter 306, received by the photoelectric conversion part 301, 302, and photoelectrically converted therein.

Figure 4:
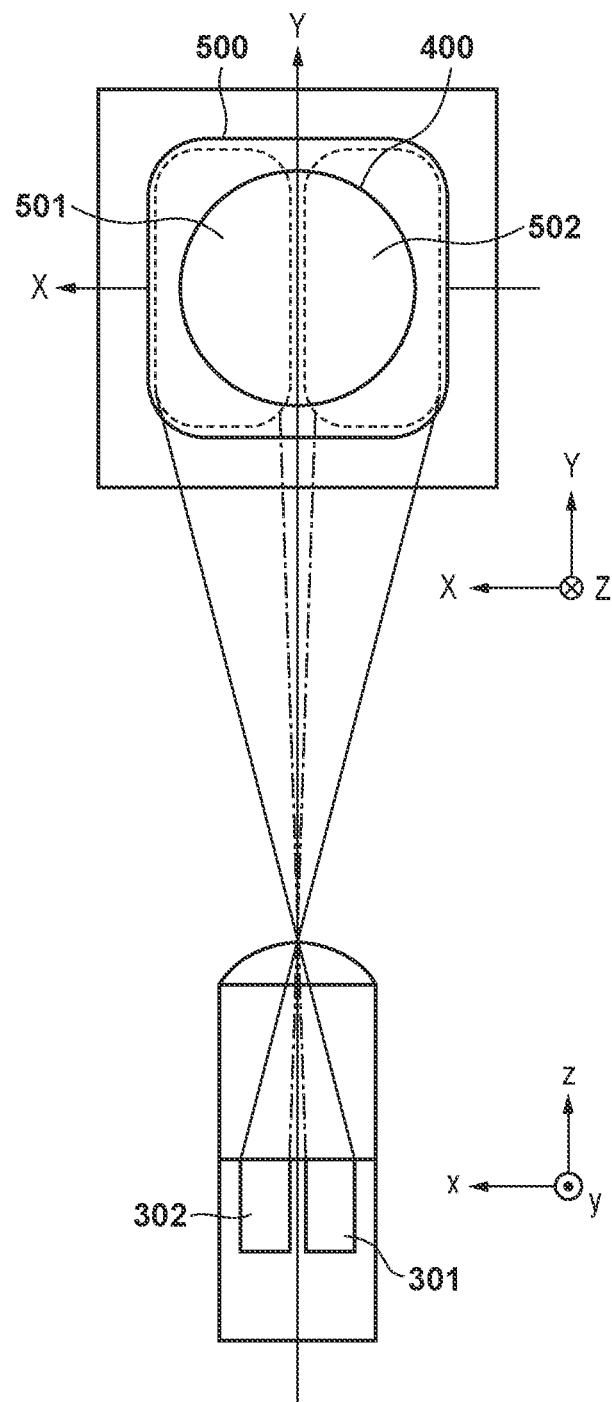
FIG. 4 is an explanatory diagram of a pixel structure in the embodiment.

Next, a relationship between the pixel structure and pupil division illustrated in FIGS. 3A and 3B will be described with reference to FIG. 4. FIG. 4 illustrates the a-a cross section of the image forming pixel illustrated in FIG. 3A as viewed from the +y side, and illustrates the exit pupil of the imaging optical system. In FIG. 4, the x direction and the y direction of the image forming pixel are reversed with respect to FIG. 3B in order to correspond to the coordinate axes of the exit pupil.

The first pupil region 501 having the center of gravity decentered to the +X side in the exit pupil is an area having a substantially conjugate relationship with the light receiving surface of the photoelectric conversion part 301 on the −x side in the image forming pixel by the microlens 305. The light flux that has passed through the first pupil region 501 is received by the photoelectric conversion unit 301, that is, the first focus detection pixel 201. The second pupil region 502 having the center of gravity decentered to the −X side in the exit pupil is an area having a substantially conjugate relationship with the light receiving surface of the photoelectric conversion part 302 on the +x side in the image forming pixel by the microlens 305. The light flux that has passed through the second pupil region 502 is received by the photoelectric conversion part 302, that is, the second focus detection pixel 202. The pupil region 500 indicates a pupil region in which light can be received by the entire image forming pixel including all the photoelectric conversion parts 301, 302 (the first and second focus detection pixels 201, 202).

Figure 5:
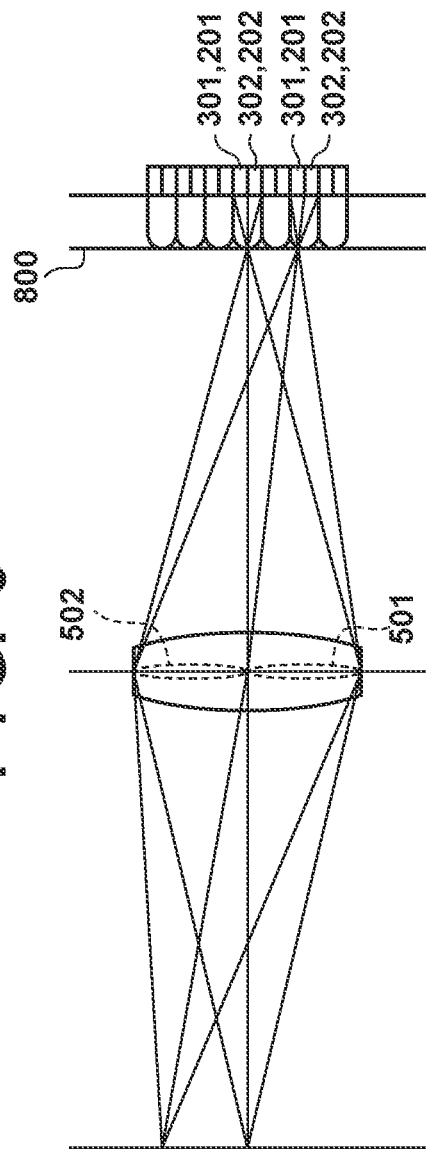
FIG. 5 is an explanatory diagram of pupil division in the embodiment.

FIG. 5 illustrates pupil division by the image capturing element 107. A pair of light fluxes that have passed through the first pupil region 501 and the second pupil region 502 enters each pixel of the image capturing element 107 at different angles, and is received by the first and second focus detection pixels 201, 202 divided into two. In the present embodiment, output signals from the plurality of first focus detection pixels 201 of the image capturing element 107 are collected to generate a first focus detection signal, and output signals from the plurality of second focus detection pixels 202 are collected to generate a second focus detection signal. Furthermore, an image forming pixel signal is generated by adding the output signal from the first focus detection pixel 201 and the output signal from the second focus detection pixel 202 of the plurality of image forming pixels. Then, the image forming pixel signals from a plurality of image forming pixels are combined to generate an image capturing signal for generating an image with a resolution corresponding to the number of effective pixels N.

Figure 6:
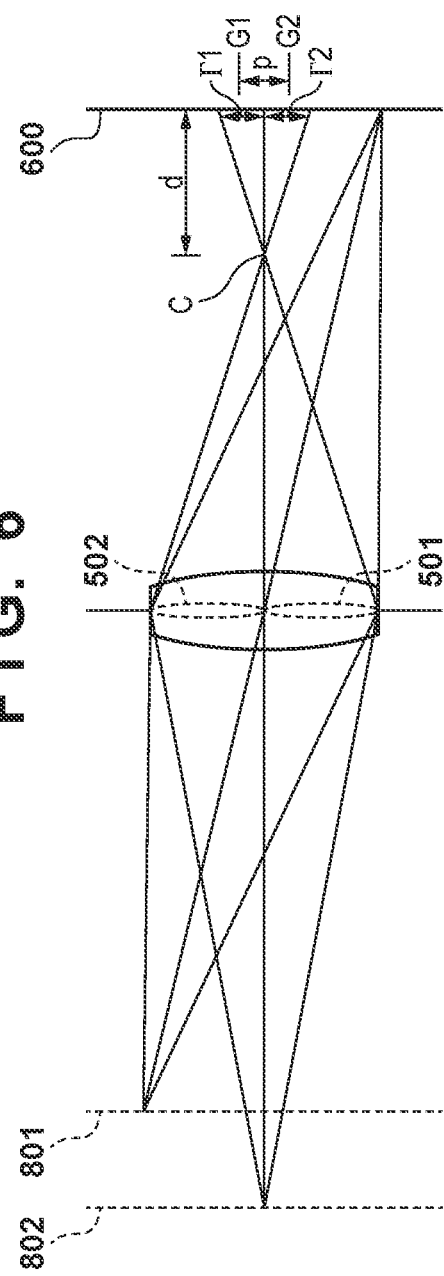
FIG. 6 is a diagram illustrating a relationship between a defocus amount and an image shift amount in the embodiment.

Next, the relationship between the defocus amount of the imaging optical system and the phase difference (image shift amount) between the first focus detection signal and the second focus detection signal acquired from the image capturing element 107 will be described with reference to FIG. 6. The image capturing element 107 is disposed on the imaging plane 600 in the drawing, and the exit pupil of the imaging optical system is divided into two areas of the first pupil region 501 and the second pupil region 502 as described with reference to FIGS. 4 and 5. The defocus amount d is defined such that a distance (size) from the image position C of the light flux from the object (801, 802) to the imaging plane 600 is |d|, and a front focus state where the image position C is closer to the object side than the imaging plane 600 is represented by a negative sign (d<0), and a back focus state where the image position C is on the side opposite of the imaging plane 600 from the object is represented by a positive sign (d>0). In the in-focus state where the image position C is on the imaging plane 600, d=0. The imaging optical system is in an in-focus state (d=0) with respect to the object 801 and is in a front focus state (d<0) with respect to the object 802. The front focus state (d<0) and the back focus state (d>0) are collectively referred to as a defocus state (|d|>0).

In the front focus state (d<0), the light flux that has passed through the first pupil region 501 (second pupil region 502) among the light fluxes from the object 802 is once collected, and then spreads to a width Γ1 (Γ2) about a centroid position G1 (G2) of the light flux, thus forming a blurred image on the imaging plane 600. The blurred image is received by each first focus detection pixel 201 (each second focus detection pixel 202) on the image capturing element 107, and a first focus detection signal (second focus detection signal) is generated. That is, the first focus detection signal (second focus detection signal) is a signal representing an object image in which the object 802 is blurred by the blur width Γ1 (Γ2) at the centroid position G1 (G2) of the light flux on the imaging plane 600.

The blur width Γ1 (Γ2) of the object image increases substantially in proportion to an increase in the magnitude |d| of the defocus amount d. Similarly, the magnitude |p| of the image shift amount p (=the difference G1−G2 between the centroid positions of the light fluxes) between the first focus detection signal and the second focus detection signal also increases substantially in proportion to the increase in the magnitude |d| of the defocus amount d. Even in the back focus state (d>0), the image shift direction between the first focus detection signal and the second focus detection signal is opposite to that in the front focus state, but is similar.

As described above, the magnitude of the image shift amount between the first and second focus detection signals increases as the magnitude of the defocus amount increases. In the present embodiment, the imaging plane phase difference detection type focus detection of calculating the defocus amount from the image shift amount between the first and second focus detection signals obtained using the image capturing element 107 is performed.

Figure 7:
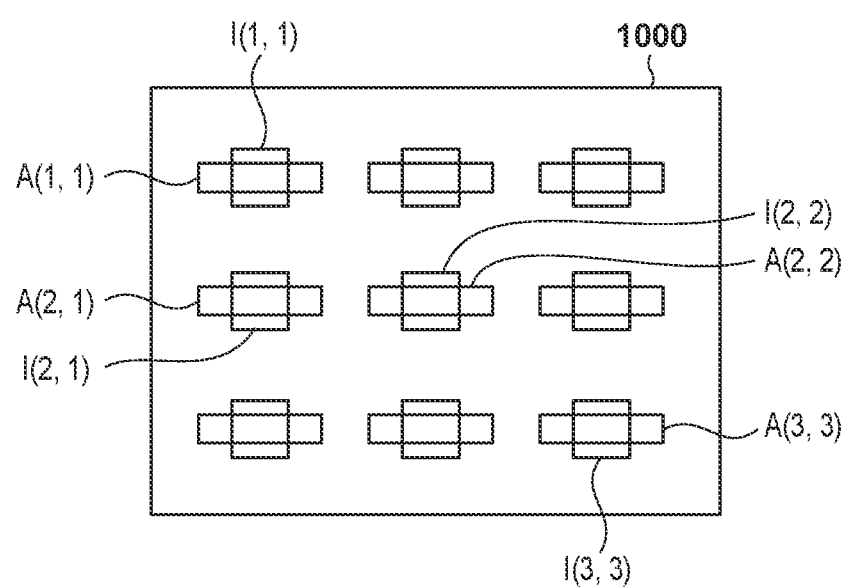
FIG. 7 is a diagram illustrating a focus detection area in the embodiment.

Next, a focus detection area in which the first and second focus detection signals are acquired in the image capturing element 107 will be described with reference to FIG. 7. In FIG. 7, A (n, m) indicates a focus detection area n-th in the x direction and m-th in the y direction among a plurality of (nine in total, three in each of the x direction and the y direction) focus detection areas set in the effective pixel region 1000 of the image capturing element 107. The first and second focus detection signals are generated from the output signals from the plurality of first and second focus detection pixels 201, 202 included in the focus detection area A (n, m). I (n, m) indicates an index for displaying the position of the focus detection area A (n, m) on the display 131.

Note that the nine focus detection areas illustrated in FIG. 7 are merely examples, and the number, position, and size of the focus detection areas are not limited. For example, one or a plurality of areas may be set as the focus detection area in a predetermined range centered on the position designated by the user or the object position detected by the object detector. In the present embodiment, the focus detection area is arranged so that a focus detection result can be obtained with higher resolution in acquiring a defocus map to be described later. For example, a total of 9600 focus detection areas are arranged in 120 horizontal divisions and 80 vertical divisions on the image capturing element.

Figure 8:
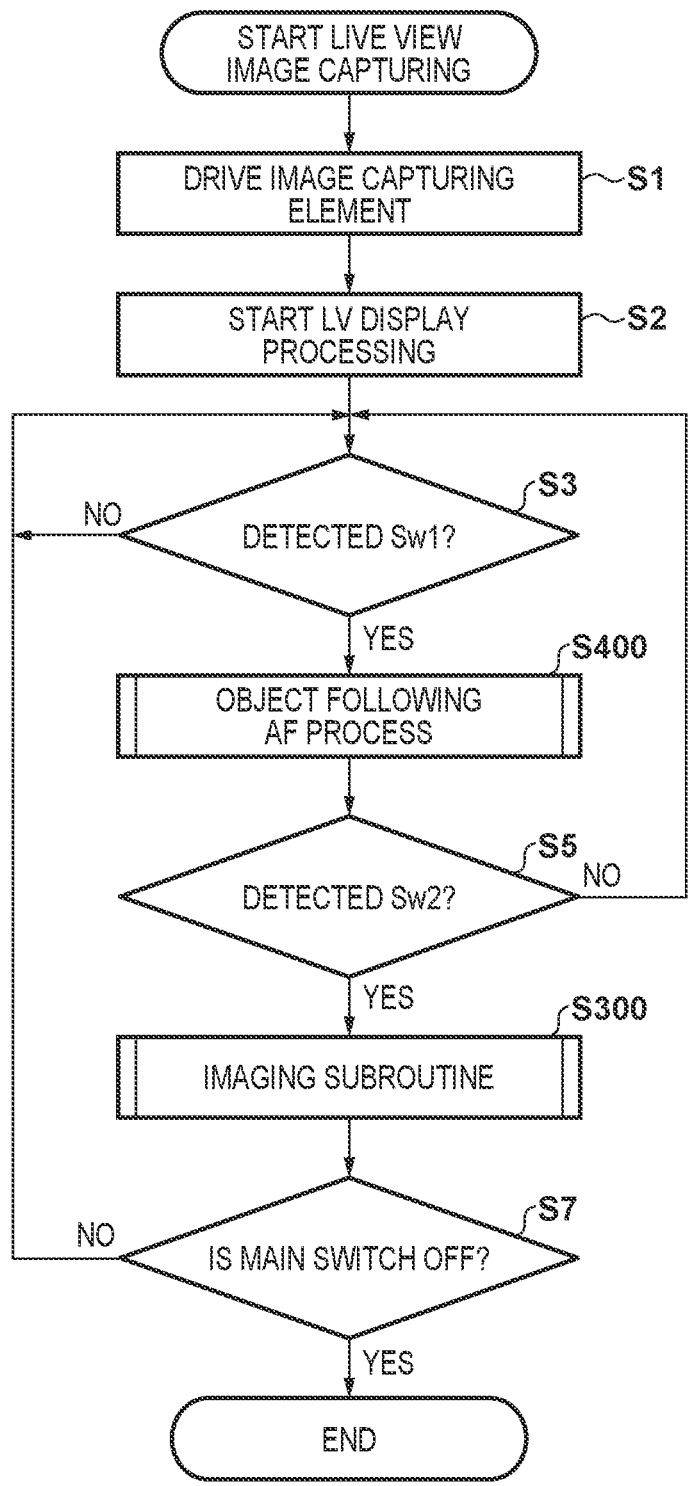
FIG. 8 is a flowchart explaining an AF and imaging process in the embodiment.

The flowchart of FIG. 8 illustrates AF/imaging process (image processing method) for causing the camera 100 of the present embodiment to perform an autofocus (AF) operation and an imaging operation. Specifically, a process of causing the camera 100 to perform an operation from before imaging of displaying a live view image on the display 131 until imaging a still image will be described. The camera CPU 121, which is a computer, executes this process in accordance with a computer program. In the following description, S means a step.

First, in S1, the camera CPU 121 causes the image capturing element drive circuit 124 to drive the image capturing element 107 and acquires imaging data from the image capturing element 107. Thereafter, the camera CPU 121 acquires the first and second focus detection signals from the plurality of first and second focus detection pixels included in each of the focus detection areas shown in FIG. 7 of the obtained imaging data. Further, the camera CPU 121 adds the first and second focus detection signals of all the effective pixels of the image capturing element 107 to generate an imaging signal, and causes the image processing circuit 125 to perform image processing on the imaging signal (imaging data) to acquire the image data. Note that, in a case where the image forming pixel and the first and second focus detection pixels are separately provided, the camera CPU 121 performs complement processing on the focus detection pixels to acquire image data.

Next, in S2, the camera CPU 121 causes the image processing circuit 125 to generate a live view image from the image data obtained in S1, and causes the display 131 to display the live view image. Note that the live view image is a reduced image corresponding to the resolution of the display 131, and the user can adjust the imaging composition, the exposure condition, and the like while viewing the reduced image. Therefore, the camera CPU 121 performs exposure adjustment based on the light measurement value obtained from the image data, and displays the same on the display 131. The exposure adjustment is realized by appropriately performing the exposure time, opening and closing of the aperture of the photographing lens, and gain adjustment on the image capturing element output.

Next, in S3, the camera CPU 121 determines whether or not the switch Sw1 instructing the start of the imaging preparation operation is turned on by the half-pressing operation of the release switch included in the operation switch group 132. When Sw1 is not turned on, the camera CPU 121 repeats the determination of S3 to monitor the timing at which Sw1 is turned on. On the other hand, when Sw1 is turned on, the camera CPU 121 proceeds to S400 and performs object following autofocus (AF) processing. Here, detection of an object region from an obtained imaging signal or a focus detection signal, setting of a focus detection area, prediction AF process for suppressing the influence of a time lag between focus detection process and imaging process of a recorded image, and the like are performed. This will be described in detail below.

Then, the camera CPU 121 proceeds to S5, and determines whether or not the switch Sw2 instructing the start of the imaging operation has been turned on by the full-pressing operation of the release switch. When Sw2 is not turned on, the camera CPU 121 returns to S3. On the other hand, when Sw2 is turned on, the process proceeds to S300, and the imaging subroutine is executed. Details of the imaging subroutine will be described later. When the imaging subroutine ends, the process proceeds to S7.

In S7, the camera CPU 121 determines whether or not the main switch included in the operation switch group 132 is turned off. The camera CPU 121 ends this process when the main switch is turned off, and returns to S3 when the main switch is not turned off.

In the present embodiment, the object detection process and the AF process are performed after the turning on of Sw1 is detected in S3, but the timing of performing these processes is not limited thereto. It is possible to eliminate the need for the preliminary operation of the photographer before the photographing by performing the object following AF process performed in S400 in a state before Sw1 is turned on.

Figure 9:
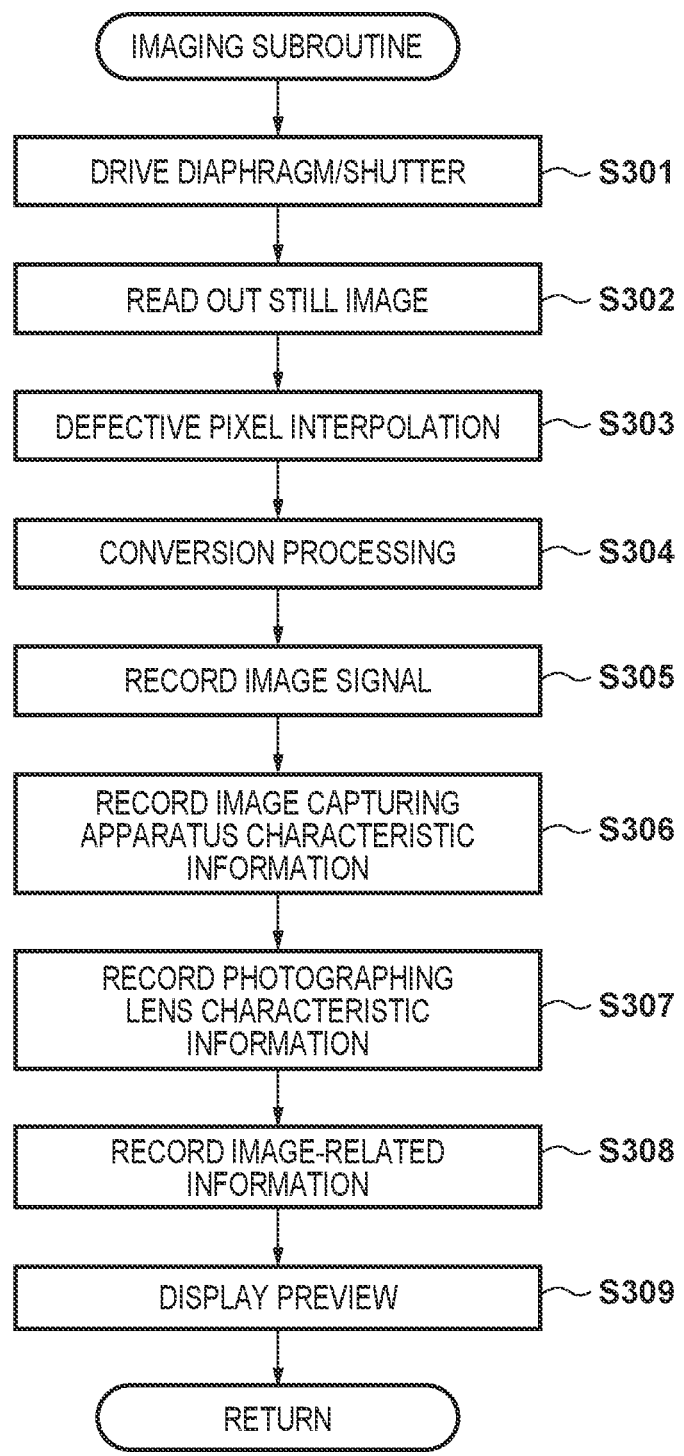
FIG. 9 is a flowchart explaining a photographing process in the embodiment.

Next, the imaging subroutine executed by the camera CPU 121 in S300 of FIG. 8 will be described with reference to the flowchart shown in FIG. 9.

In S301, the camera CPU 121 performs exposure control process and determines imaging conditions (shutter speed, aperture value, imaging sensitivity, etc.). This exposure control process can be performed using luminance information acquired from image data of a live view image.

Then, the camera CPU 121 transmits the determined aperture value to the aperture drive circuit 128 to drive the aperture 102. In addition, the camera CPU 121 transmits the determined shutter speed to the shutter 108 to perform an operation of opening the focal plane shutter. Furthermore, the camera CPU 121 causes the image capturing element 107 to accumulate charges during the exposure period through the image capturing element drive circuit 124.

In S302, the camera CPU 121 that performed the exposure control process causes the image capturing element drive circuit 124 to read out all the pixels of the imaging signal for imaging a still image from the image capturing element 107. Furthermore, the camera CPU 121 causes the image capturing element drive circuit 124 to read out one of the first and second focus detection signals from the focus detection area (focusing target area) in the image capturing element 107. The first or second focus detection signal read out at this time is used to detect the focus state of the image at the time of image reproduction described later. The other focus detection signal can be acquired by subtracting one of the first and second focus detection signals from the imaging signal.

Next, in S303, the camera CPU 121 causes the image processing circuit 125 to perform a defective pixel correction process on the imaging data read in S302 and A/D converted.

Furthermore, in S304, the camera CPU 121 causes the image processing circuit 125 to perform image processing and encoding processing such as demosaic (color interpolation) processing, white balance processing, γ correction (gradation correction) processing, color conversion processing, and edge enhancement processing on the imaging data after the defective pixel correction process.

Then, in S305, the camera CPU 121 records still image data serving as image data obtained by performing the image processing and the encoding processing in S304 and one focus detection signal read in S302 in the flash memory 133 as an image data file.

Next, in S306, the camera CPU 121 records the camera characteristic information serving as the characteristic information of the camera 100 in the flash memory 133 and the memory in the camera CPU 121 in association with the still image data recorded in S305. The camera characteristic information includes, for example, the following information.

Imaging conditions (aperture value, shutter speed, imaging sensitivity, etc.)

Information related to image processing performed by the image processing circuit 125

Information related to a light reception sensitivity distribution of an image forming pixel and a focus detection pixel of the image capturing element 107

Information related to vignetting of an imaging light flux in the camera 100

Information on the distance from the mounting surface of the imaging optical system to the image capturing element 107 in the camera 100

Information related to a manufacturing error of the camera 100

The information related to the light receiving sensitivity distribution of the image forming pixel and the focus detection pixel (hereinafter, simply referred to as light receiving sensitivity distribution information) is information on the sensitivity of the image capturing element 107 corresponding to the distance (position) on the optical axis from the image capturing element 107. Since the light sensitivity distribution information depends on the microlens 305 and the photoelectric conversion part 301, 302, the information may be information related thereto. In addition, the light sensitivity distribution information may be information on a change in sensitivity with respect to an incident angle of light.

Next, in S307, the camera CPU 121 records lens characteristic information serving as characteristic information of the imaging optical system in the flash memory 133 and the memory in the camera CPU 121 in association with the still image data recorded in S305. The lens characteristic information includes, for example, information related to an exit pupil, information related to a frame such as a lens barrel that emits a light flux, information related to a focal length and an F-number at the time of imaging, information related to aberration of the imaging optical system, information related to a manufacturing error of the imaging optical system, and information related to a position (object distance) of the focus lens 105 at the time of imaging.

Next, in S308, the camera CPU 121 records image-related information serving as information related to still image data in the flash memory 133 and the memory in the camera CPU 121. The image-related information includes, for example, information related to a focus detection operation before imaging, information related to movement of an object, and information related to focus detection accuracy.

Next, in S309, the camera CPU 121 displays a preview of the captured image on the display 131. As a result, the user can easily confirm the captured image.

When the process of S309 ends, the camera CPU 121 ends the present imaging subroutine, and proceeds to S7 of FIG. 8.

Next, a subroutine of the object following AF process executed by the camera CPU 121 in S400 of FIG. 8 will be described with reference to a flowchart illustrated in FIG. 10.

In S401, the camera CPU 121 calculates an image shift amount between the first and second focus detection signals obtained in each of the plurality of focus detection areas acquired in S1 of FIG. 8, and calculates a defocus amount for each focus detection area from the image shift amount. As described above, in the present embodiment, a group of focus detection results obtained from a focus detection area in which a total of 9600 points are arranged in 120 horizontal divisions and 80 vertical divisions on the image capturing element is referred to as a defocus map.

Next, in the S402, the camera CPU 121 performs object detection and tracking process. The object detection unit 140 described above performs the object detection process. Since the object may not be detected depending on the state of the obtained image, in such a case, tracking process using other means such as template matching is performed to estimate the position of the object. This will be described in detail below.

Next, in the S403, the camera CPU 121 acquires posture information from the respective joint positions of the plurality of objects detected by the object detection unit 140.

Figure 11A:
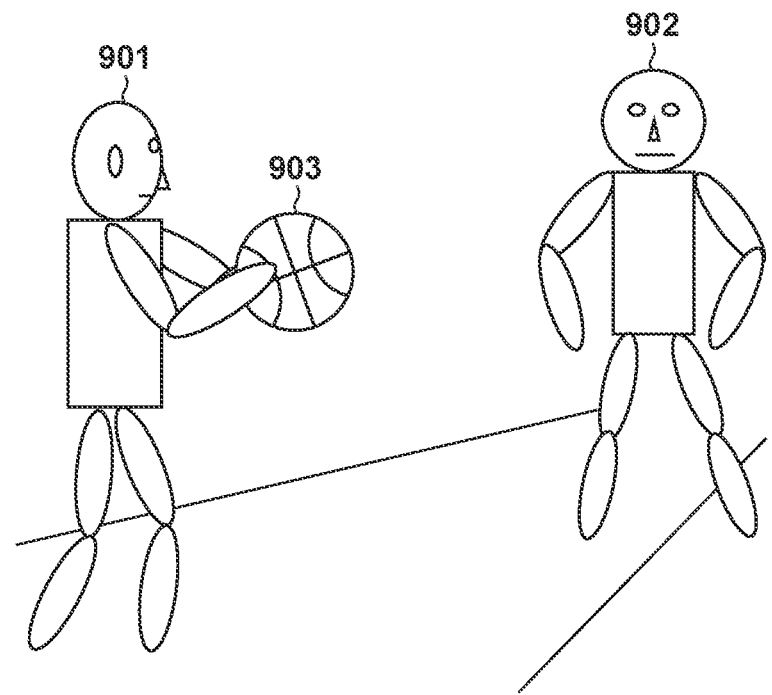
FIGS. 11A and 11B are explanatory diagrams of posture information in the embodiment.
Figure 11B:
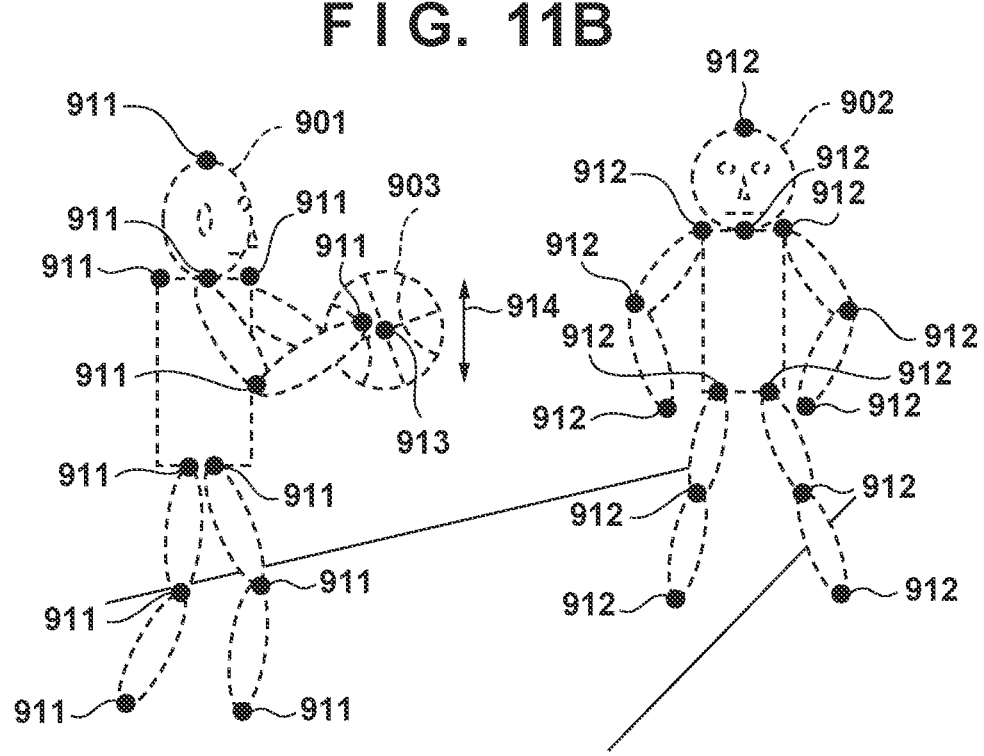

FIGS. 11A and 11B are conceptual diagrams of information acquired by the posture acquisition unit 142. FIG. 11A illustrates an image to be processed, and an object 901 catches a ball 903. The object 901 is an important object in the photographing scene. In the present embodiment, an object that is highly likely to be in focus by the photographer is determined by using the posture information of the object. On the other hand, the object 902 is a non-main object.

FIG. 11B is a diagram illustrating an example of posture information of the objects 901 and 902 and a position and a size of the ball 903. A joint 911 represents each joint of the object 901, and a joint 912 represents each joint of the object 902. FIG. 11B illustrates an example in which the positions of the top of the head, the neck, the shoulder, the elbow, the wrist, the waist, the knee, and the ankle are acquired as the joints, but the joint positions may be some of these positions, or another position may be acquired. Furthermore, not only the joint positions but also information such as axes connecting the joints may be used, and any information can be used as the posture information as long as the information indicates the posture of the object. Hereinafter, a case where joint positions are acquired as posture information will be described.

The posture acquisition unit 142 acquires two-dimensional coordinates (x, y) in the images of the joint 911 and the joint 912. Here, the unit of (x, y) is pixel. The centroid position 913 represents the centroid position of the ball 903, and the arrow 914 represents the size of the ball 903 in the image. The object detection unit 140 acquires the two dimensional coordinates (x, y) of the centroid position of the ball 903 in the image and the number of pixels indicating the width of the ball 903 in the image.

Next, in S404, the camera CPU 121 performs posture type determination process based on the object detection result in S402 and the posture information of the object in S403. Here, the posture type determination will be described.

Figure 12A:
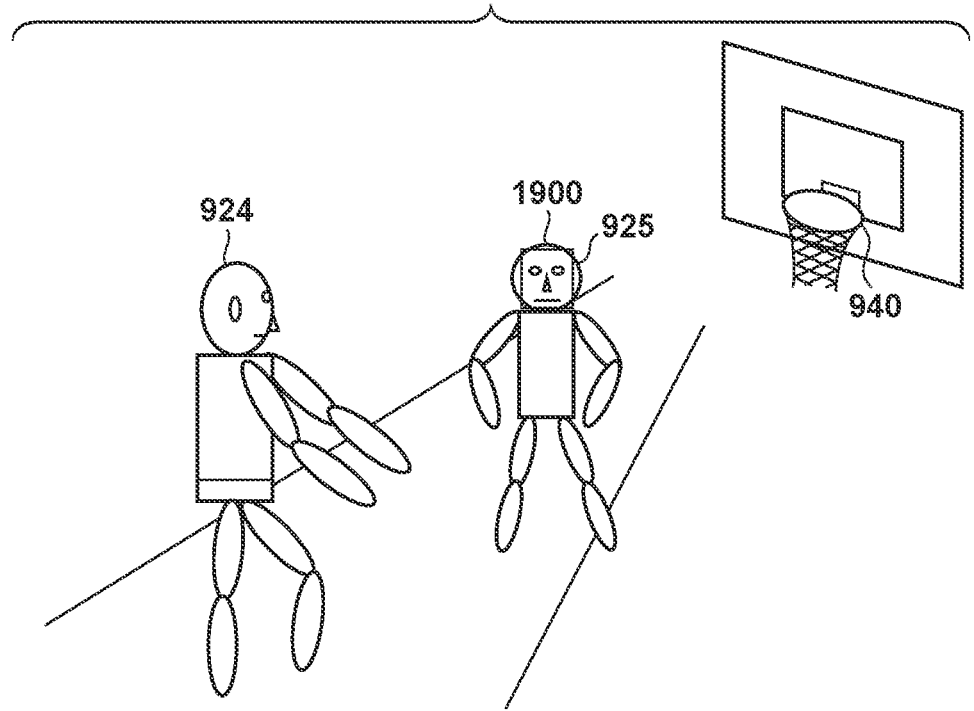
FIG. 12A is a conceptual diagram illustrating a main object determination process in the embodiment.
Figure 12B:
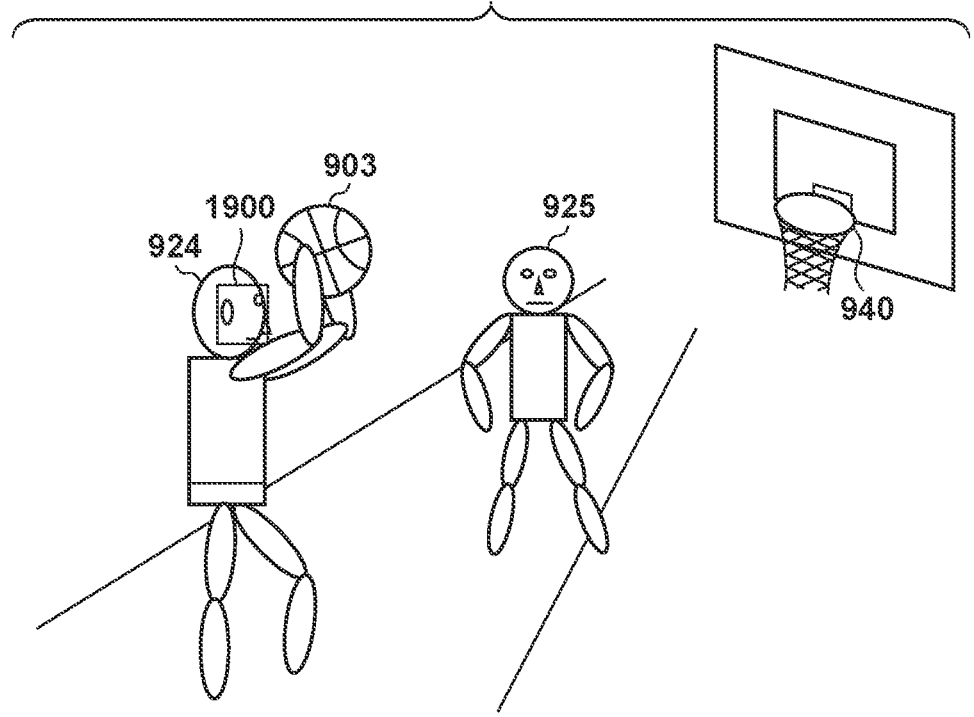
FIG. 12B is a conceptual diagram illustrating the main object determination process in the embodiment.
Figure 12C:
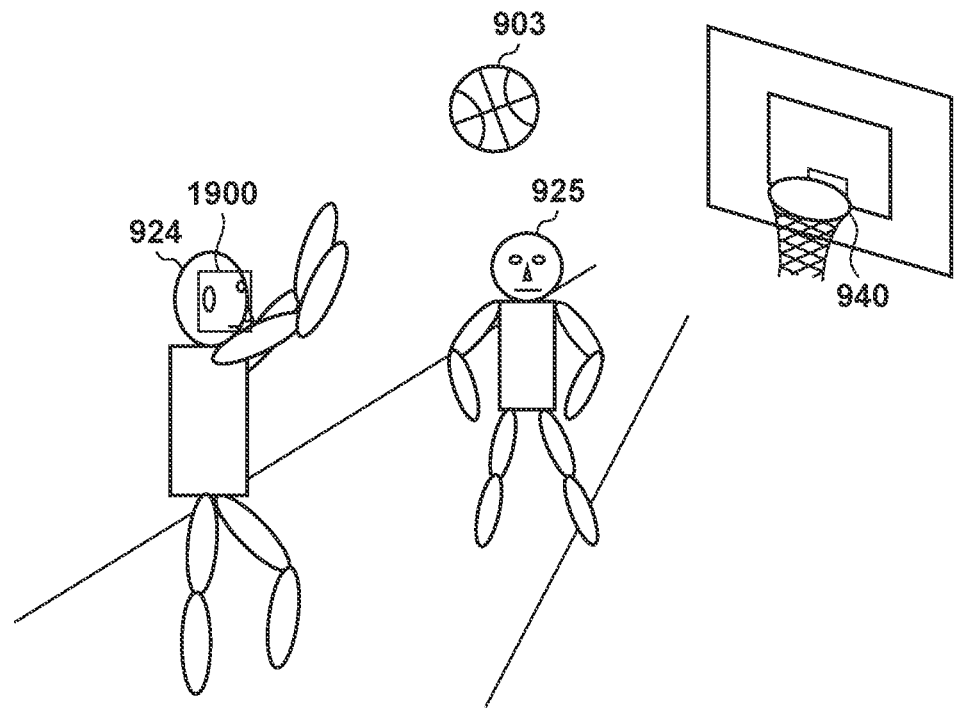
FIG. 12C is a conceptual diagram illustrating the main object determination process in the embodiment.

FIGS. 12A to 12C are schematic diagrams illustrating positions of players in a basketball game. In FIGS. 12A to 12C, the player 924 and the player 925 are main object candidates recognized as an object taking an action posture based on information from the posture acquisition unit 142. Here, the action posture means a posture of an object desired to be photographed by the user, such as a posture in which the player is aiming for a shot.

In FIG. 12A, an AF frame 1900 is set in the player 925 with the player 925 as a main object. In FIG. 12B, the player 924 holds the ball 903 and takes a posture of aiming for a shot toward the goal ring 940. The camera CPU 121 detects the joints of the player by a known method using the neural network of the posture acquisition unit 142. Then, it is estimated that the player 924 takes the shooting action posture from the position information of the joint and the information of the dictionary data storage unit 141, and information of the average posture duration at the time of the shooting action posture is acquired. Note that, for the posture estimation here, for example, as disclosed in Japanese Patent Laid-Open No. 2022-135552, a method of estimating a posture by performing depth detection, joint detection, or organ detection with respect to an image can be used. FIG. 12C illustrates a scene in which the player 924 shoots and the ball 903 moves toward the goal ring 940.

Figure 13A:
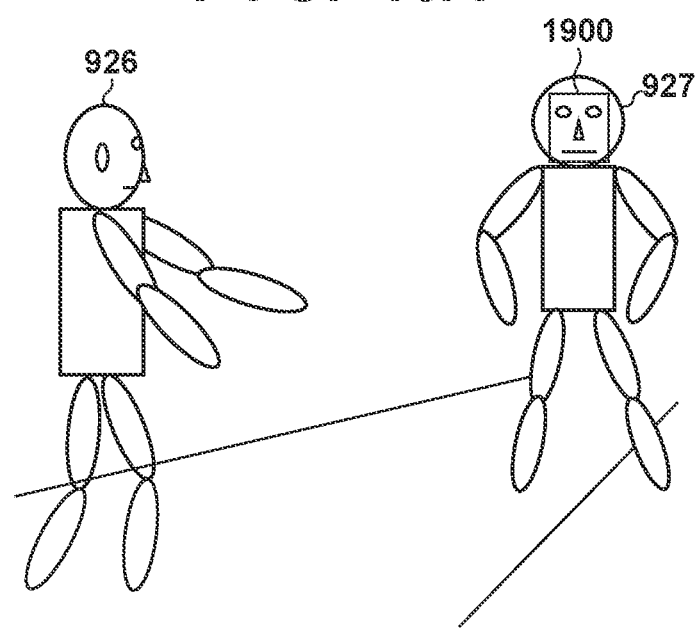
FIG. 13A is a conceptual diagram illustrating a main object determination process in the embodiment.
Figure 13B:
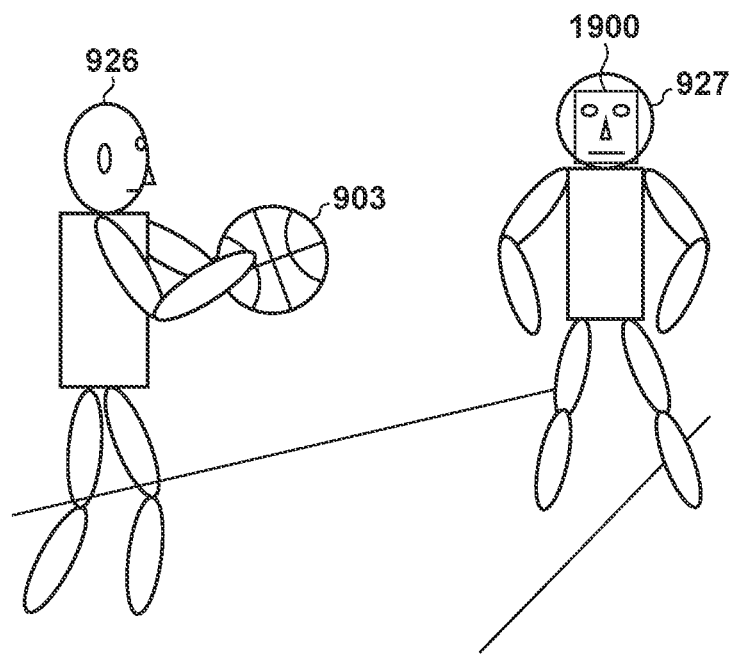
FIG. 13B is a conceptual diagram illustrating the main object determination process in the embodiment.
Figure 13C:
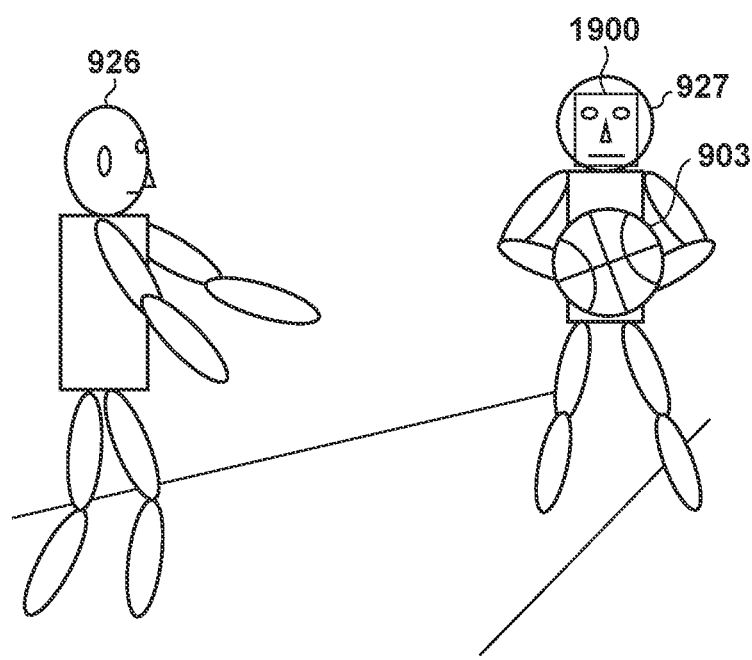
FIG. 13C is a conceptual diagram illustrating the main object determination process in the embodiment.

FIGS. 13A to 13C are schematic diagrams illustrating positions of players in different states in a basketball game. FIG. 13A illustrates a scene where the player 926 and the player 927 are present. FIG. 13B shows a scene where the player 926 has the ball 903 and the player 927 is waiting for a pass from the player 926. FIG. 13C illustrates a scene where the player 926 passes to the player 927. In FIGS. 13B and 13C, the camera CPU 121 recognizes the player 926 and the player 927 as the pass action posture based on the posture information of the player 926 and the player 927 obtained by the posture acquisition unit 142. In addition, information on the average posture duration at the time of the pass action posture is acquired. The information on the type determination of the posture and the duration type of the posture acquired at this time is used as a determination element of the reliability of the main object likelihood for the selection of the main object to be described later, and the length of the posture duration is proportional to the degree of reliability.

Figure 10:
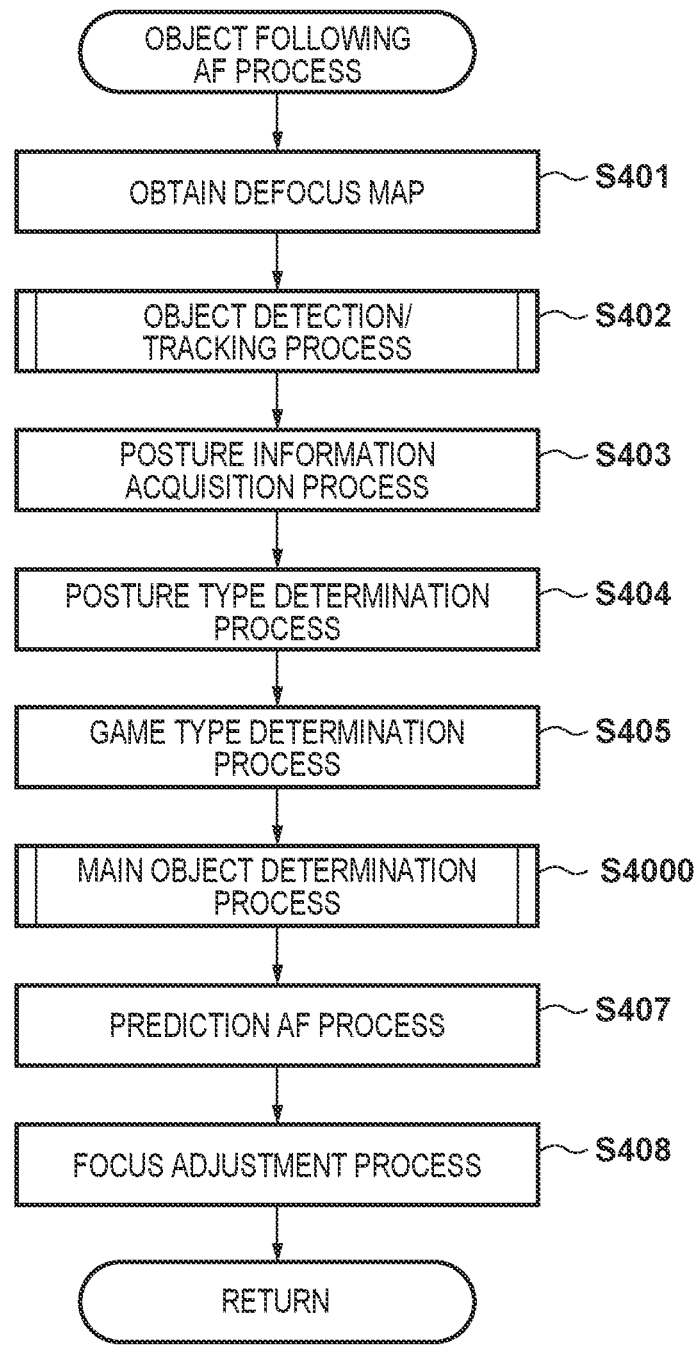
FIG. 10 is a flowchart explaining an object following AF process in the embodiment.

Returning to the description of FIG. 10, in S405, the camera CPU 121 performs a game type determination process. The process of determining the game type is performed from the object detection result in S402, the posture information in S403, the posture type information in S404, and the detected motions of the plurality of objects. The game type will be described later. Note that a function of selecting the game type in advance may be provided instead of determining the game type.

A method of determining a game type in S405 will be described. For example, for the image of FIG. 12B, the camera CPU 121 acquires joint connection information by posture estimation from the posture acquisition unit 142, motion vector information of a person and an object other than a person from the game type acquisition unit 143, and information of the dictionary data storage unit 141. Based on these pieces of information, the type of game played by the two players 924 and 925 is determined to be basketball. At this time, the type of game may be determined in consideration of goal ring and court information other than the moving object.

Next, in S4000, the camera CPU 121 performs a main object determination process. The main object is determined using the defocus map obtained in S401, the object detection result obtained in S402, the posture information obtained in S403, the posture type information obtained in S404, and the game type information obtained in S405. Details will be described later with reference to a sub-flowchart of FIG. 15.

Next, in S407, the camera CPU 121 performs the prediction AF process using the focus detection result acquired in S401 and a plurality of defocus amounts that are time-series data of the timing at which the focus detection was performed in the past.

This is a process required in a case where there is a time lag between the timing at which the focus detection is performed and the timing at which the exposure of the captured image is performed. In this process, the AF control is performed by predicting the position of the object in the optical axis direction at the timing of exposing the captured image after a predetermined time from the timing of performing the focus detection. In the prediction of the image plane position of the object, a multivariate analysis (e.g., a least squares method) is performed using history data of past image plane positions of the object and time to obtain an equation of a prediction curve. It is possible to calculate the image plane predicted position of the object by substituting the time of the timing at which the captured image is exposed into the obtained equation for the prediction curve.

Furthermore, not only the optical axis direction but also the three-dimensional position may be predicted. A vector in the XYZ direction is obtained with the screen as the XY plane and the optical axis direction as the Z direction. Specifically, the position of the object at the timing of exposure of the captured image is predicted from the XY position of the object obtained by the object detection/tracking process in S402 and the time-series data of the Z-direction position based on the defocus amount obtained in S405. Furthermore, prediction may be made from time-series data of joint positions of a person who is an object. Note that the prediction target includes a main object, a plurality of other persons, and a moving object other than a person.

Next, in S408, the camera CPU 121 calculates the driving amount of the focus lens by using the result of the main object determination process in S4000, the defocus amount obtained in S401, and the result of the prediction AF process in S407. Then, the camera CPU 121 drives the focus actuator 114 based on the driving amount, and moves the third lens group 105 in the optical axis direction to perform focus adjustment process.

Note that, in the focus adjustment process, focus adjustment is performed on the main object determined by the main object determination process in S4000 so as to avoid sudden acceleration/deceleration focus movement and achieve smooth focus transition. In addition, the focus adjustment may be performed according to the photographing sequence of the image capturing apparatus, the control of the photographing lens that performs the focus adjustment, and the drive performance. For example, in a case where the lens driving time is long as the photographing sequence, the focus driving time can be secured, so that the threshold value of the defocus amount described later is increased to make lens driving easy. On the other hand, in the case of a sequence in which the lens driving time is short, the focus driving time cannot be secured, and thus the threshold value of the defocus amount described later may be reduced to make lens driving difficult. In addition, since a driving amount by which focus driving can be performed per unit time varies depending on a driving source of the focus lens, a threshold value of a defocus amount to be described later may be changed according to the difference in the driving source of the focus lens.

When the process of S408 ends, the camera CPU 121 ends the subroutine of the object following AF process and proceeds to S5 of FIG. 8.

Next, a subroutine of the object detection/tracking process executed by the camera CPU 121 in S402 of FIG. 10 will be described with reference to a flowchart illustrated in FIG. 14.

In S2000, the camera CPU 121 sets the dictionary data according to the type of the object to be detected on the basis of the data detected from the image data acquired in S1 of FIG. 8. The dictionary data to be used in the present process is selected from the plurality of dictionary data stored in the dictionary data storage unit 141 based on the priority of the object and the setting of the image capturing apparatus set in advance. For example, a plurality of types of dictionary data in which objects are classified, such as "person", "vehicle", and "animal", are stored as the plurality of dictionary data. In the present embodiment, one dictionary data or a plurality of dictionary data may be selected. In one case, it is possible to repeatedly detect an object that can be detected by one dictionary data with high frequency. On the other hand, in a case of selecting a plurality of dictionary data, it is possible to sequentially detect the object by sequentially setting the dictionary data according to the priority as the detection object.

Next, in step S2001, the object detection unit 140 uses the image data read in step S1 as an input image and performs object detection of a person or an object other than a person by using the dictionary data set in step S2000. At this time, the object detection unit 140 outputs information such as the position, size, and reliability of the detected object. At this time, the camera CPU 121 may cause the display 131 to display the information output from the object detection unit 140.

In S2001, the object detection unit 140 detects a plurality of regions hierarchically for a person who is a first type of object from the image data. For example, in a case where "person" is set as the dictionary data, a plurality of organs such as a "whole body" area, a "face" area, and an "eye" area are detected. A local area such as an eye or a face of a person is an area in which it is desired to adjust a focus or an exposure state as an object, but may not be detected depending on a surrounding obstacle or a direction of the face. Even in such a case, since the object can be continuously detected robustly by detecting the entire body, the object is detected hierarchically.

Next, in S2002, the object detection unit 140 detects a person or an object other than a person, which is a second type of object different from the first type of object in S2001. For example, dictionary data for detecting a person involved in a game is selected from a plurality of dictionary data stored in the dictionary data storage unit 141. Then, after a person is detected as an object, the dictionary data is changed to dictionary data of a detected object, and area detection of the entire object and detection of the object center position and size are performed. Note that the detected object may be specified and detected in advance.

Any method may be used for object detection, and for example, a method described in Document 2 below can be used. In the present embodiment, the second type of object is a ball, but may be another unique object such as a racket. (Second Document)

Redmon, Joseph, et al., "You only look once: Unified, real-time object detection.", Proceedings of the IEEE conference on computer vision and pattern recognition, 2016, Pages: 779-788, Volume: 1, DOI Bookmark: 10.1109/CVPR.2016.91.

Next, in S2003, the camera CPU 121 performs known template matching process using the object detection area obtained in S2001 as a template. Using a plurality of images obtained in the S1 of FIG. 8, a similar area is searched for in the image obtained immediately before using the object detection area obtained in the past image as a template. As the information used for template matching, as is well known, any of luminance information, color histogram information, feature point information such as corners and edges, and the like may be used. Various matching methods and template update methods are conceivable, but any method may be used. The tracking process performed in S2003 is performed to implement stable object detection/tracking process by detecting an area similar to the past object detection data from the image data obtained immediately before when the object is not detected in S2001.

When the process of S2003 ends, the camera CPU 121 ends the subroutine of the object detection/tracking process, and proceeds to S403 of FIG. 10.

Next, a subroutine of the main object determination process performed in S4000 of FIG. 10 will be described with reference to a flowchart illustrated in FIG. 15.

In S4001, the camera CPU 121 selects an object candidate that has a likelihood of the main object from the plurality of objects based on the defocus map (focusing state) acquired in S401 of FIG. 10 and the posture information in S403. The likelihood of the main object is the reliability (probability) that is calculated based on the posture information and is the main object of the object taking the action posture of the shoot or the pass described up to S405 of FIG. 10. Hereinafter, a case where the probability that the object is the main object of the processing target image is adopted as the reliability (degree of possibility that the object is the main object of the processing target image) representing the main object likelihood will be described, but values other than the probability may be used. For example, the inverse number of the distance between the centroid position of the object and the centroid position of the unique object can be used as the reliability.

<Method for Calculating Probability of being Main Object>

Hereinafter, a method of calculating the probability representing the main object likelihood based on the coordinates and the size of each joint will be described. Hereinafter, a case of using a neural network which is a method of machine learning will be described.

Figure 16:
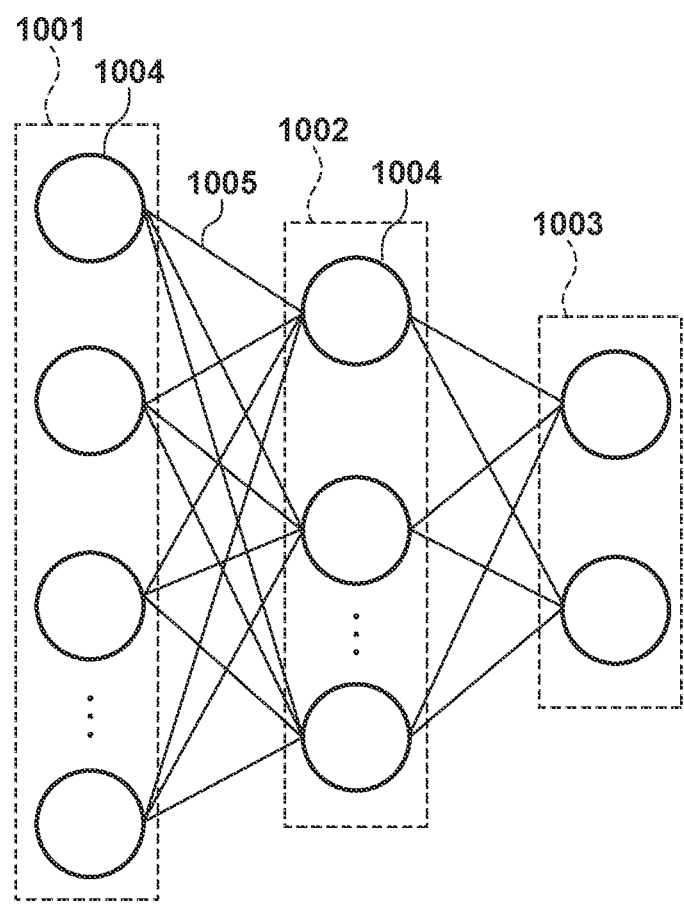
FIG. 16 is a diagram illustrating an example of a structure of a neural network in the embodiment.

FIG. 16 is a diagram illustrating an example of a structure of a neural network. In FIG. 16, reference numeral 1001 denotes an input layer, reference numeral 1002 denotes an intermediate layer, reference numeral 1003 denotes an output layer, reference numeral 1004 denotes a neuron, and reference numeral 1005 denotes a line representing a connection relationship between the neurons 1004. Here, for convenience of illustration, numbers are assigned only to representative neurons and connection lines. It is assumed that the number of neurons 1004 of the input layer 1001 is equal to the dimension of input data, and the number of neurons of the output layer 1003 is two. This corresponds to the problem of two-class classification for determining whether or not the object is likely to be the main object.

A weight wij is given to a line 1005 connecting the i-th neuron 1004 of the input layer 1001 and the j-th neuron 1004 of the intermediate layer 1002, and a value zj output by the j-th neuron 1004 in the intermediate layer 1002 is given by the following equation.

$$z_j = h(b_j + \sum_i w_{ji} x_i) \quad (1)$$

$$h(z) = \max(z, 0) \quad (2)$$

In equation (1), xi represents a value input to the i-th neuron 1004 of the input layer 1001. The sum is assumed for all the neurons 1004 of the input layer 1001 connected to the j-th neuron. Here, bj is called a bias, and is a parameter that controls the easiness of firing of the j-th neuron 1004. In addition, the function h defined by equation (2) is an activation function called rectified linear unit (ReLU). As the activation function, another function such as a sigmoid function can be used.

Furthermore, the value yk output by the k-th neuron 504 of the output layer 1003 is given by the following equation.

$$y_k = f(b_k + \sum_j w_{kj} z_j) \quad (3)$$

$$f(y_k) = \frac{\exp(y_k)}{\sum_i \exp(y_i)} \quad (4)$$

In equation (3), zj represents a value output by the j-th neuron 1004 of the intermediate layer 1002, and i, k=0, 1. 0 corresponds to the non-main object, and 1 corresponds to the likelihood of the main object. The sum is taken for all the neurons in the intermediate layer 1002 connected to the k-th neuron. In addition, the function f defined by equation (4) is called a Softmax function, and outputs a probability value belonging to the k-th class. In the present embodiment, $f(y1)$ is used as the probability representing the likelihood of the main object.

At the time of learning, the coordinates of the joint of the person and the coordinates and the size of the ball are input. Then, all the weights and biases are optimized so as to minimize the loss function using the output probability and the correct answer label. Here, the correct answer label takes a binary value of "1" in the case of the main object and "0" in the case of the non-main object. As the loss function L, a binary cross entropy as expressed below can be used.

$$L(y, t) = \sum_m t_m \log y_m - \sum_m (1 - t_m) \log(1 - y_m) \quad (5)$$

In equation (5), a subscript m represents an index of an object to be learned. Here, ym is a probability value output from a neuron of k=1 in the output layer 1003, and tm is a correct answer label. The loss function may be any function that can measure the degree of coincidence with the correct answer label, such as a mean square error, other than equation (5). The weight or bias can be determined so that the correct answer label approaches the output probability value by performing optimization based on equation (5). The learned weight and bias value are stored in advance in the flash memory 133 and stored in the RAM in the camera CPU 121 as necessary. A plurality of types of weights and bias values may be prepared according to the scene. The probability value $f(y1)$ is output based on equations (1) to (4) using the learned weight and bias (result of machine learning performed in advance).

Note that, in learning, a state before shifting to an important action can be learned as a state of main object likelihood. For example, in the case of throwing a ball, a state in which a hand is extended forward when throwing the ball can be learned as one of the states of the main object likelihood. The reason for adopting this configuration is that the control of the image capturing apparatus needs to be accurately executed when the main object likelihood actually takes an important action. For example, in a case where the reliability (probability value) corresponding to the main object likelihood exceeds a preset first predetermined value, the photographer can capture an image without missing an important moment by starting control (recording control) of automatically recording an image or a video. At this time, information of a typical time from the state of the learning target to the important action may be used for control of the image capturing apparatus.

The method for calculating probability using the neural network has been described above, but another machine learning method such as a support vector machine or a decision tree may be used as long as classification of whether or not the object is likely to be the main object is possible. In addition, not limited to machine learning, a function that outputs reliability or a probability value may be constructed based on a certain model. It is also possible to use the value of the monotonically decreasing function with respect to the distance between the person and the ball on the assumption that the closer the distance between the person and the ball is, the higher the reliability of the main object likelihood.

Note that, although the main object likelihood is determined using the ball information, the main object likelihood can be determined using only the posture information of the object. Depending on the type (e.g., a pass, a shoot, etc.) of the posture information of the object, it may be better or worse to also use the ball information. For example, in the case of shooting, the distance between the person and the ball becomes long, but there is a case where the photographer wants to make the object who made the shot look like the main object, and thus the main object likelihood may be determined only from the posture information of the person who is the object without depending on the ball, or the main object likelihood may be determined using the information of the ball according to the type from the posture information of the object.

In addition, data obtained by performing predetermined conversion such as linear conversion on the coordinates of each joint and the coordinates and size of the ball may be used as the input data. In addition, when the main object likelihood is frequently switched between two objects having a defocus difference, it is often different from the photographer's intention. Therefore, switching may be prevented by detecting that switching is frequently performed from the time-series data of the reliability of each object and increasing the reliability of either object (e.g., an object on the near side) between the two objects. Furthermore, a region including two objects may be set as a region representing the main object likelihood.

As still another method, the posture information of the person, the positions of the person and the ball, the defocus amount of each object, and the time-series data of the reliability indicating the main object likelihood may be used as the input data. In addition, the above-described prediction process may be performed, and the reliability may be calculated using, as input data, data obtained by predicting the coordinates of the joint of the person, and the coordinates and the size of the ball at the time of the timing the exposure of the captured image is performed. Whether or not to use the data subjected to the prediction processing may be switched according to the image plane moving speed of the object and the time-series change amount of the coordinates of each joint. By doing so, in a case where the posture change of the object is small, the accuracy of the reliability indicating the main object likelihood can be maintained, and in a case where the posture change of the object is large, the object indicating the main object likelihood can be detected at an earlier time by using the result of the prediction process. The reliability of the plurality of first type of objects is calculated by the above method.

Next, in S4002, the camera CPU 121 determines the reliability of the main object likelihood. In addition to the object targeted by the photographer in the AF frame 1900, in a case where there is an object having the highest (higher) reliability indicating the main object likelihood based on the posture information among the plurality of objects determined as the main object candidates in S4001, the process proceeds to S4003. When such an object does not exist, that is, when the reliability of the main object corresponding to the current AF frame 1900 is the highest, the process proceeds to S4009.

Next, in S4003, the camera CPU 121 acquires the posture type information of the main object candidate having the highest reliability determined in S4001 (state determination). The posture type information is determination information as to what kind of motion the object motion is, such as shoot, pass, dribble, spike, block, or receive, acquired by the posture acquisition unit 142 as described above, and information regarding the posture duration of the posture type.

Next, in S4004, the camera CPU 121 acquires the game type information from the game type acquisition unit 143 for the main object candidate determined in S4003 (game determination). The game type is information on what kind of game such as basketball, volleyball, or soccer is being played in consideration of the information of the posture acquisition unit 142 as described above, and the posture duration is set for each game. At this time, in addition to the posture motion information of the object person, moving object information such as a ball and fixed object information such as a goal ring, a net, and a goal net may be used as additional information for determining the game type, or the game type may be set in advance.

Next, in S4005, the camera CPU 121 acquires the defocus amount of the main object candidate determined in S4003.

Next, in S4006, the camera CPU 121 sets a threshold value of the defocus amount for focusing for each main object candidate without a sudden focus change based on the posture duration and the defocus amount (focusing state) estimated from the information of the posture type and the game type of the main object candidate determined in S4003, S4004, and S4005. The setting of the threshold value of the defocus amount will be described in detail below.

With reference to FIGS. 12A to 12C, threshold value setting in a case where the game type is basketball and the posture type is a shooting action (shooting posture) will be described.

In basketball, it is assumed that the situation of the game changed from the situation illustrated in FIG. 12A to the situation illustrated in FIG. 12B. FIG. 12A illustrates a situation in which there are two players 924, 925 and the AF frame 1900 is set to the player 925. FIG. 12B illustrates a situation in which the player 924 holds the ball 903 and takes a shooting posture toward the goal ring 940.

Figure 15:
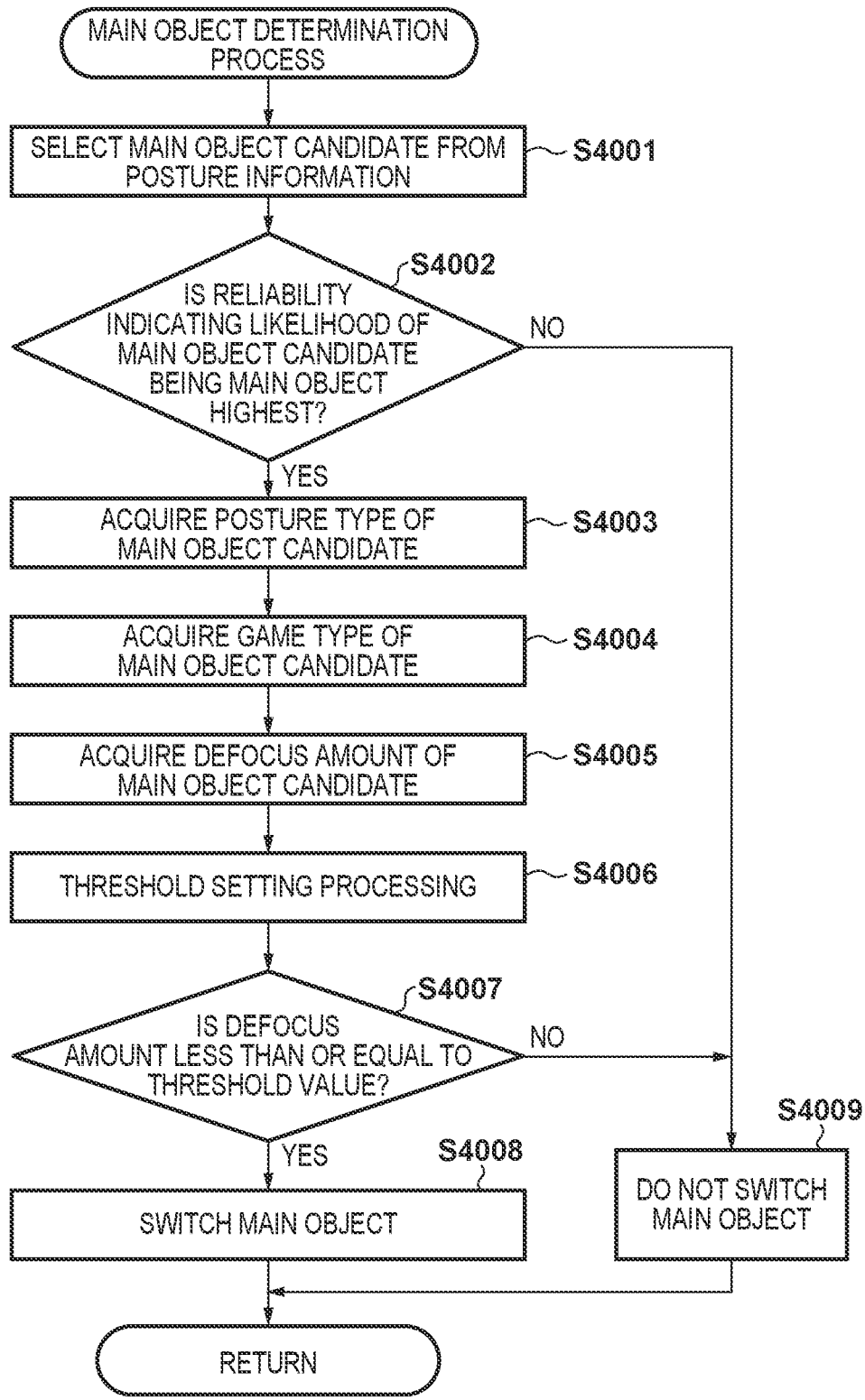
FIG. 15 is a flowchart explaining the main object determination process in the embodiment.

Here, when the control for determining whether or not to switch from the state in which the AF frame 1900 is located in the player 925 as illustrated in FIG. 12A to the state in which the AF frame is located in the player 924 as illustrated in FIG. 12B is applied to the flowchart of FIG. 15, the following is obtained.

When the situation of the play is changed from the situation of FIG. 12A to the situation of FIG. 12B, in the flowchart of FIG. 15, in S4002, the player 924, who is a candidate for a main object close to the ball, for example, has higher reliability of the main object likelihood than the object where the AF frame 1900 is currently located. Therefore, the process proceeds to S4003. In S4003, the posture type of the player 924 in FIG. 12B is determined to be the shooting posture. In S4004, the current game type is determined to be basketball. In S4005, the defocus amount of the player 924 who is the main object candidate is acquired. In S4006, the threshold value of a defocus amount for switching the main object, in other words, the threshold value of a defocus amount of the player 924 for switching the AF frame 1900 from the player 925 to the player 924 is set.

Here, in the case of basketball, the posture duration of the player 924 who makes the shoot is relatively long and is longer than a predetermined time defined in advance. Then, since the motion is not frequently switched, the main object likelihood is maintained. Therefore, even if the AF frame 1900 is switched from the player 925 to the player 924, a time for focus driving can be secured, and there is a high possibility that the focus can be moved to the player 924 who is the main object candidate.

For this reason, in S4006, the threshold value of the defocus amount of the player 924 who is the main object candidate is set to a large value, for example, 90 Fδ (Fδ represents the defocus amount when the best focus position is set to 0 with the aperture value F of the photographing lens and the allowable circle of confusion δ). When the threshold value of the defocus amount is set to be large, even if the defocus amount of the player 924 is slightly large, it is determined to be less than or equal to the threshold value in S4007, and determination is made to move the AF frame 1900. Therefore, the AF frame is easily moved, and the AF frame 1900 is moved from the player 925 to the player 924 in S4008. In this manner, the AF frame is quickly moved to the player 924 who is the main object candidate to be focused.

Next, it is assumed that the situation of the game changed from the situation illustrated in FIG. 12B to the situation illustrated in FIG. 12C. FIG. 12C illustrates a situation in which the player 924 shoots and the ball 903 moves toward the goal ring 940. In this case, in FIG. 12C, there is no player other than the player 924 with high reliability of the main object likelihood. Therefore, the process proceeds from S4002 to S4009 in FIG. 15, and the AF frame 1900 of the player 924 is continued.

Next, threshold value setting in a case where the game type is basketball and the posture type is a pass action (pass posture) will be described with reference to FIGS. 13A to 13C.

In basketball, it is assumed that the situation of the game changed from the situation illustrated in FIG. 13A to the situations illustrated in FIGS. 13B and 13C. FIG. 13A illustrates a situation where two players 926 and 927 are present and the AF frame 1900 is set to the player 927. FIG. 13B illustrates a situation where the player 926 received the ball 903. FIG. 13C illustrates a situation where the player 926 passes the ball 903 to the player 927.

Here, when the control for determining whether or not to switch from the state in which the AF frame 1900 is located in the player 927 as illustrated in FIG. 13A to the state in which the AF frame is located in the player 926 is applied to the flowchart of FIG. 15, the following is obtained.

When the situation of the play is changed from the situation of FIG. 13A to the situation of FIG. 13B, in the flowchart of FIG. 15, in S4002, the player 926, who is a candidate for a main object close to the ball, for example, has higher reliability of the main object likelihood than the object where the AF frame 1900 is currently located. Therefore, the process proceeds to S4003. In S4003, the posture type of the player 926 in FIG. 13B is determined to be the pass posture. In S4004, the current game type is determined to be basketball. In S4005, the defocus amount of the player 926 who is the main object candidate is acquired. In S4006, the threshold value of a defocus amount for switching the main object, in other words, the threshold value of a defocus amount of the player 926 for switching the AF frame 1900 from the player 927 to the player 926 is set.

Here, in the case of basketball, it is expected that the posture duration of the player 924 who passes is shorter than the posture duration of a motion to shoot or the like and shorter than a predetermined time defined in advance. Since the motion is frequently switched, it is difficult to maintain the main object likelihood. Therefore, even when the AF frame 1900 is switched from the player 927 to the player 926, there is a possibility the main object may be switched after the switching.

For this reason, in S4006, the threshold value of the defocus amount of the player 926 who is the main object candidate is set to a small value, for example, 20 Fδ (Fδ represents the defocus amount when the best focus position is set to 0 with the aperture value F of the photographing lens and the allowable circle of confusion δ). When the threshold value of the defocus amount is set to be small, even if the defocus amount of the player 926 is relatively small, it is determined to be larger than the threshold value in S4007, and determination is made to not move the AF frame 1900. Therefore, the AF frame is less likely to be moved, and the AF frame 1900 is not moved from the player 927 to the player 926 in S4008. In this way, when the main object is frequently switched, it is possible to prevent the focus driving from being performed back and forth and to improve the stability of the focus driving.

Next, it is assumed that the situation of the game changed from the situation illustrated in FIG. 13B to the situation illustrated in FIG. 13C. In this case, in FIG. 13C, since the player 927 has the ball 903, there is no player other than the player 927 with high reliability of main object likelihood. Therefore, the process proceeds from S4002 to S4009 in FIG. 15, and the AF frame 1900 of the player 927 is continued.

Next, threshold value setting in a case where the game type is volleyball and the posture type is a spiking action (spiking posture) will be described with reference to FIGS. 17A and 17B.

In volleyball, it is assumed that the situation of the game changed from the situation illustrated in FIG. 17A to the situation illustrated in FIG. 17B. FIG. 17A illustrates a situation where the player 932 jumps in accordance with the timing of toss of the ball 940 of the player 934, and the player 933 exists on the other side of the net 905. The AF frame 1900 is set to the player 932. FIG. 17B illustrates a situation where the player 932 jumps to block the spike immediately after the player 933 spikes.

Here, when the control for determining whether or not to switch from the state in which the AF frame 1900 is located in the player 932 as illustrated in FIG. 17A to the state in which the AF frame is located in the player 933 is applied to the flowchart of FIG. 15, the following is obtained.

When the situation of the play is changed from the situation of FIG. 17A to the situation of FIG. 17B, in the flowchart of FIG. 15, in S4002, the player 933, who is a candidate for a main object close to the ball, for example, has higher reliability of the main object likelihood than the object where the AF frame 1900 is currently located. In that case, the process proceeds to S4003. In S4003, the posture type of the player 932 in FIG. 17B is determined to be the spiking posture. In S4004, the current game type is determined to be volleyball. In S4005, the defocus amount of the player 933 who is the main object candidate is acquired. In S4006, the threshold value of a defocus amount for switching the main object, in other words, the threshold value of a defocus amount of the player 933 for switching the AF frame 1900 from the player 932 to the player 933 is set.

Here, in the case of volleyball, the posture duration of the player 932 who spikes is very short. Since the motion is frequently switched, it is difficult to maintain the main object likelihood. Therefore, even when the AF frame 1900 is switched from the player 932 to the player 933, there is a possibility the main object may be switched after the switching.

For this reason, in S4006, the threshold value of the defocus amount of the player 932 who is the main object candidate is set to a small value, for example, 15 Fδ (Fδ represents the defocus amount when the best focus position is set to 0 with the aperture value F of the photographing lens and the allowable circle of confusion δ). When the threshold value of the defocus amount is set to be small, even if the defocus amount of the player 933 is relatively small, it is determined to be larger than the threshold value in S4007, and determination is made to not move the AF frame 1900. Therefore, the AF frame is less likely to be moved, and the AF frame 1900 is not moved from the player 932 to the player 933 in S4008. In this way, when the main object is frequently switched, it is possible to prevent the focus driving from being performed back and forth and to improve the stability of the focus driving.

With reference to FIGS. 18A and 18B, threshold value setting in a case where the game type is soccer and the posture type is a shooting action (shooting posture) will be described.

In soccer, it is assumed that the situation of the game changed from the situation illustrated in FIG. 18A to the situation illustrated in FIG. 18B. FIG. 18A illustrates a situation where the player 936 has the ball 960, the player 935 is waiting for the ball 960 and the player 937 is waiting as a goalkeeper. The AF frame 1900 is set to the player 936. FIG. 18B illustrates a situation where the player 935 who received the pass from the player 936 shoots toward the soccer goal 961.

Here, when the control for determining whether or not to switch from the state in which the AF frame 1900 is located in the player 936 as illustrated in FIG. 18A to the state in which the AF frame is located in the player 935 as illustrated in FIG. 18B is applied to the flowchart of FIG. 15, the following is obtained.

When the situation of the play is changed from the situation of FIG. 18A to the situation of FIG. 18B, in the flowchart of FIG. 15, in S4002, the player 935, who is a candidate for a main object close to the ball, for example, has higher reliability of the main object likelihood than the object where the AF frame 1900 is currently located. Therefore, the process proceeds to S4003. In S4003, the posture type of the player 935 in FIG. 18B is determined to be the shooting posture. In S4004, the current game type is determined to be soccer. In S4005, the defocus amount of the player 935 who is the main object candidate is acquired. In S4006, the threshold value of a defocus amount for switching the main object, in other words, the threshold value of a defocus amount of the player 935 for switching the AF frame 1900 from the player 936 to the player 935 is set.

Here, in the case of soccer, the posture duration of the player 935 who shoots is relatively long and is longer than a predetermined time defined in advance. Then, since the motion is not frequently switched, the main object likelihood is maintained. Therefore, even if the AF frame 1900 is switched from the player 936 to the player 935, a time for focus driving can be secured, and there is a high possibility that the focus can be moved to the player 935 who is the main object candidate.

For this reason, in S4006, the threshold value of the defocus amount of the player 935 who is the main object candidate is set to a large value, for example, 80 Fδ (Fδ represents the defocus amount when the best focus position is set to 0 with the aperture value F of the photographing lens and the allowable circle of confusion δ). When the threshold value of the defocus amount is set to be large, even if the defocus amount of the player 935 is slightly large, it is determined to be less than or equal to the threshold value in S4007, and determination is made to move the AF frame 1900. Therefore, the AF frame is easily moved, and the AF frame 1900 is moved from the player 936 to the player 935 in S4008. In this manner, the AF frame is quickly moved to the player 935 who is the main object candidate to be focused.

As described above, in the present embodiment, in the case of the game type and the posture type in which the motion of the object is not frequently switched and the object is easily maintained as the main object, the threshold value of the defocus amount is set large so that the main object is easily switched (the AF frame is easily moved). On the other hand, in the case of the game type and the posture type in which the motion of the object is frequently switched and the object is difficult to be maintained as the main object, the threshold value of the defocus amount set small so that the main object is difficult to be switched (the AF frame is difficult to be moved). As a result, the focus control can be appropriately performed according to the game type, the posture type, and the defocus amount.

Note that the threshold value of the defocus amount set in S4006 may be set on the basis of only the posture type (action recognition) regardless of the game. Furthermore, it may be changed according to a difference in a photographing sequence on the image capturing apparatus side, a drive processing time of the photographing optical system, and the like.

Second Embodiment

Next, a second embodiment of the present invention will be described. The configuration of the image capturing apparatus according to the present embodiment is similar to that of the first embodiment illustrated in FIG. 1, and hereinafter, the same components as those of the first embodiment will be denoted with the same reference numerals as those of the first embodiment and description thereof will be omitted, and only differences from the first embodiment will be described.

Figure 19:
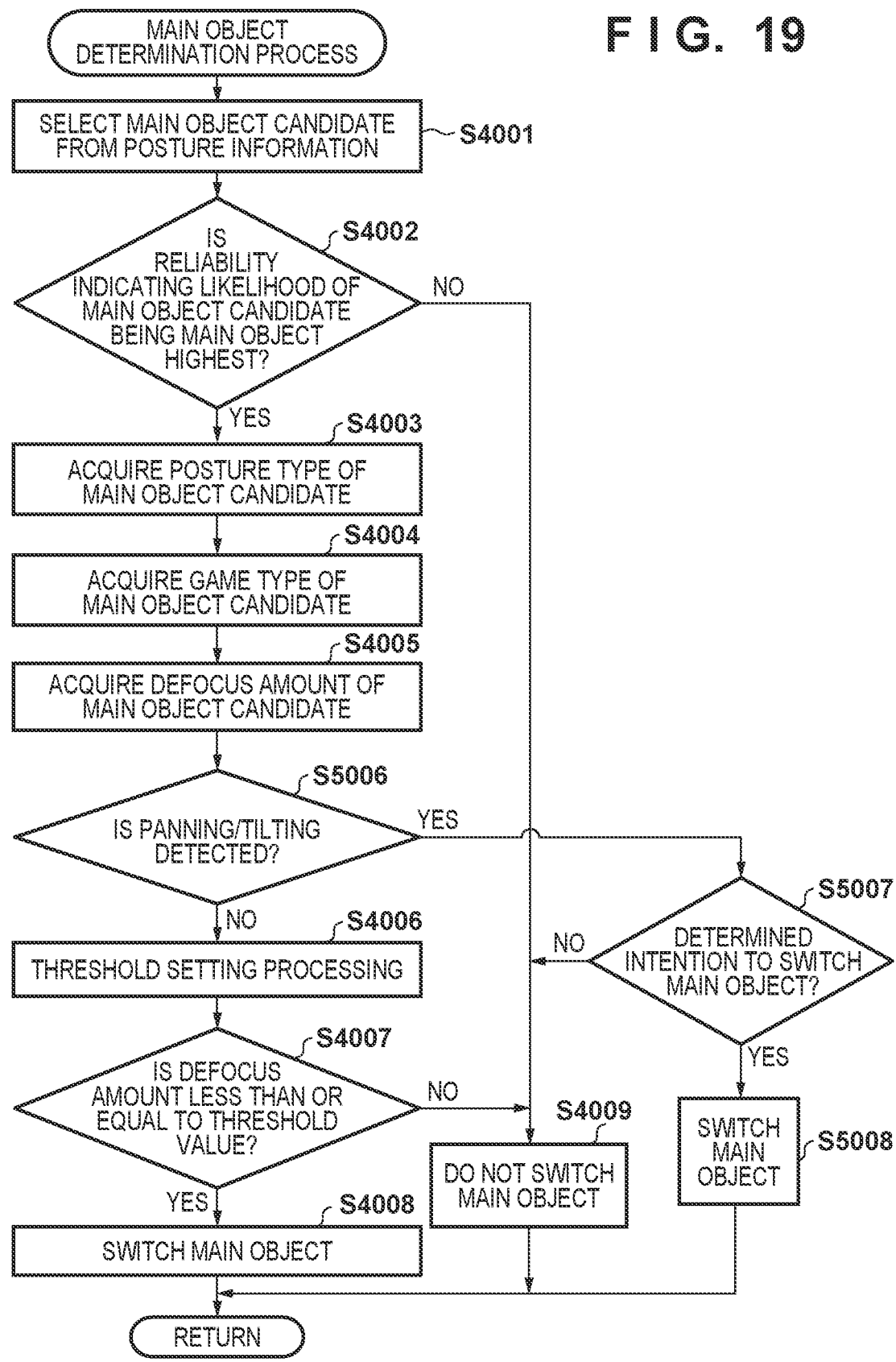
FIG. 19 is a flowchart explaining a main object determination process in a second embodiment.

Switching of the main object performed by the camera CPU 121 mainly based on the information from the photographer's intention estimation unit 146 will be described with reference to the flowchart of FIG. 19. Note that the processes illustrated in the steps of S4001 to S4005 and S4006 to S4009 are the same as the case of FIG. 15, and S5006 to S5008 different from FIG. 15 will be described below.

In S5006, the camera CPU 121 detects whether the photographer is performing the panning/tilting operation by the pan/tilt detection unit 144, and proceeds to S5007 when detecting the operation. If the operation is not detected, the process proceeds to S4006.

Here, an example of the switching operation of the main object when the panning/tilting operation is detected will be described with reference to FIGS. 20A to 20C.

Figure 20A:
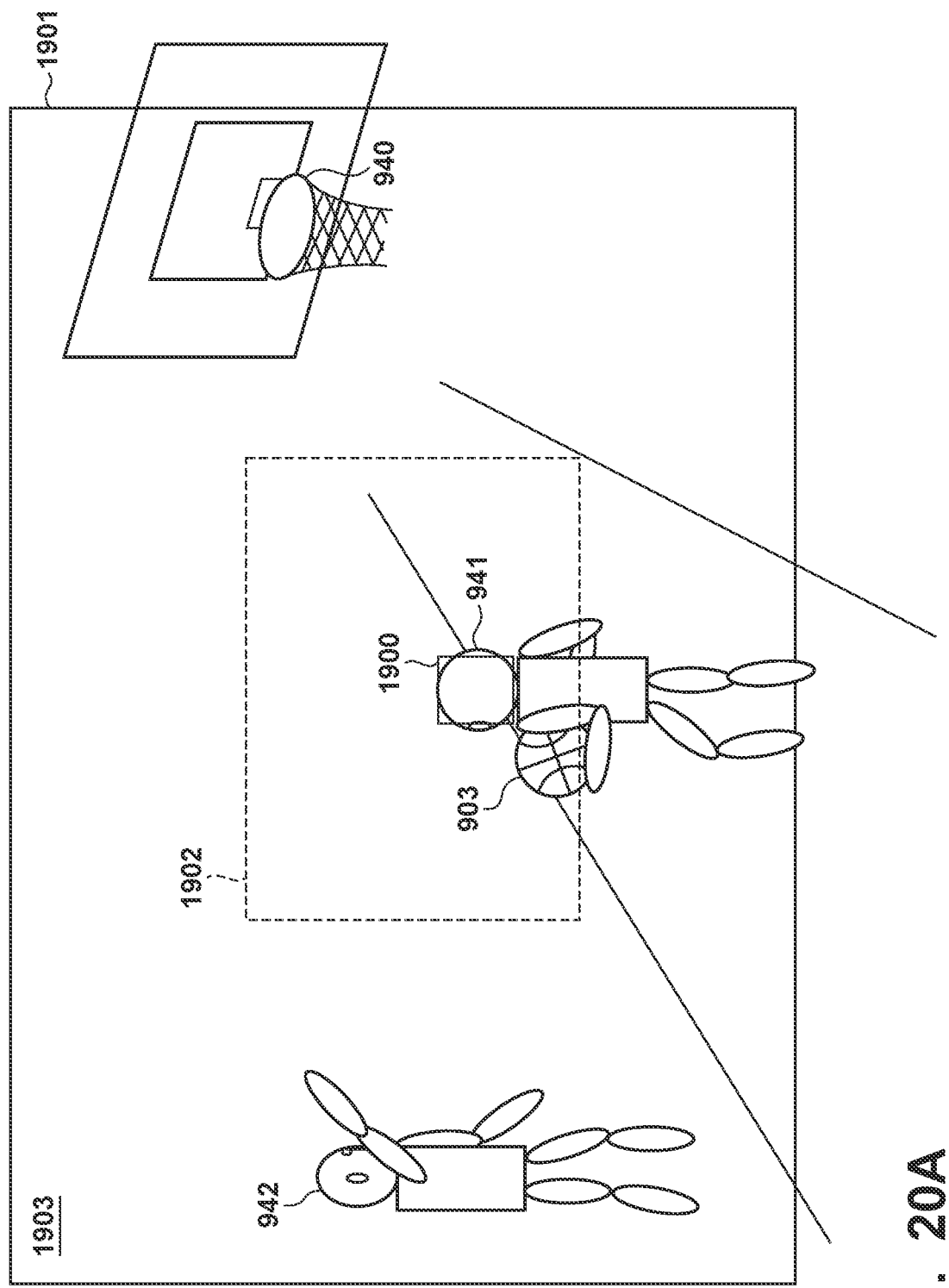
FIG. 20A is a conceptual diagram describing the main object determination process in the second embodiment.

FIG. 20A illustrates a situation in which the player 941 is present in the central image height 1902 of the photographing view angle 1901 and the player 942 is present in the peripheral image height 1903. The AF frame 1900 is set to the player 941, and the posture of the player 942 is detected as a main object candidate.

Figure 20B:
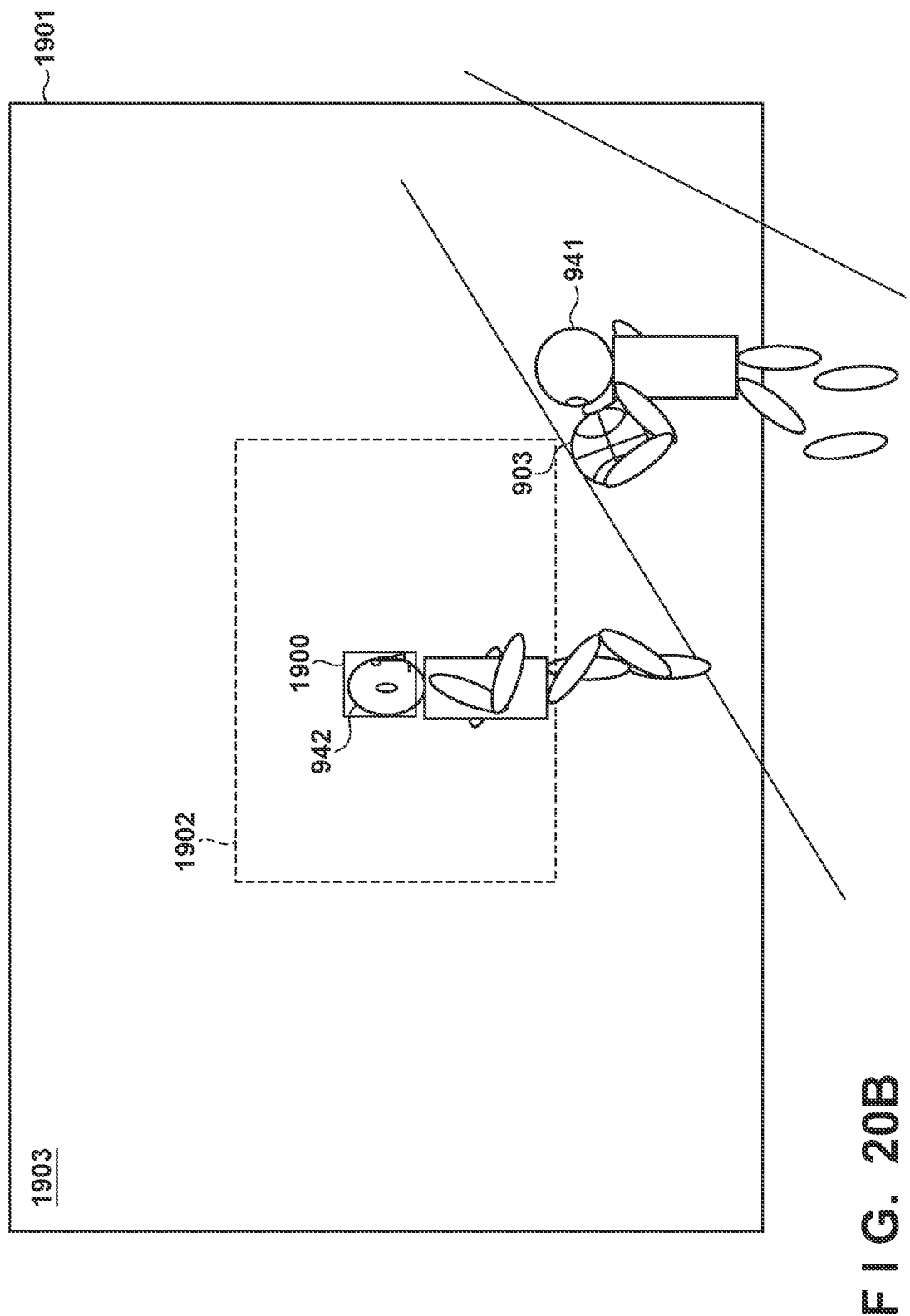
FIG. 20B is a conceptual diagram describing the main object determination process in the second embodiment.

FIG. 20B illustrates a state where the photographer intentionally moves the player 942 into central image height 1902 of the photographing view angle 1901 by the panning/tilting operation. At this time, the pan/tilt detection unit 144 detects the panning/tilting operation, and the camera CPU 121 switches the player 942 from the main object candidate to the main object, and sets the AF frame 1900 to the player 942.

Figure 20C:
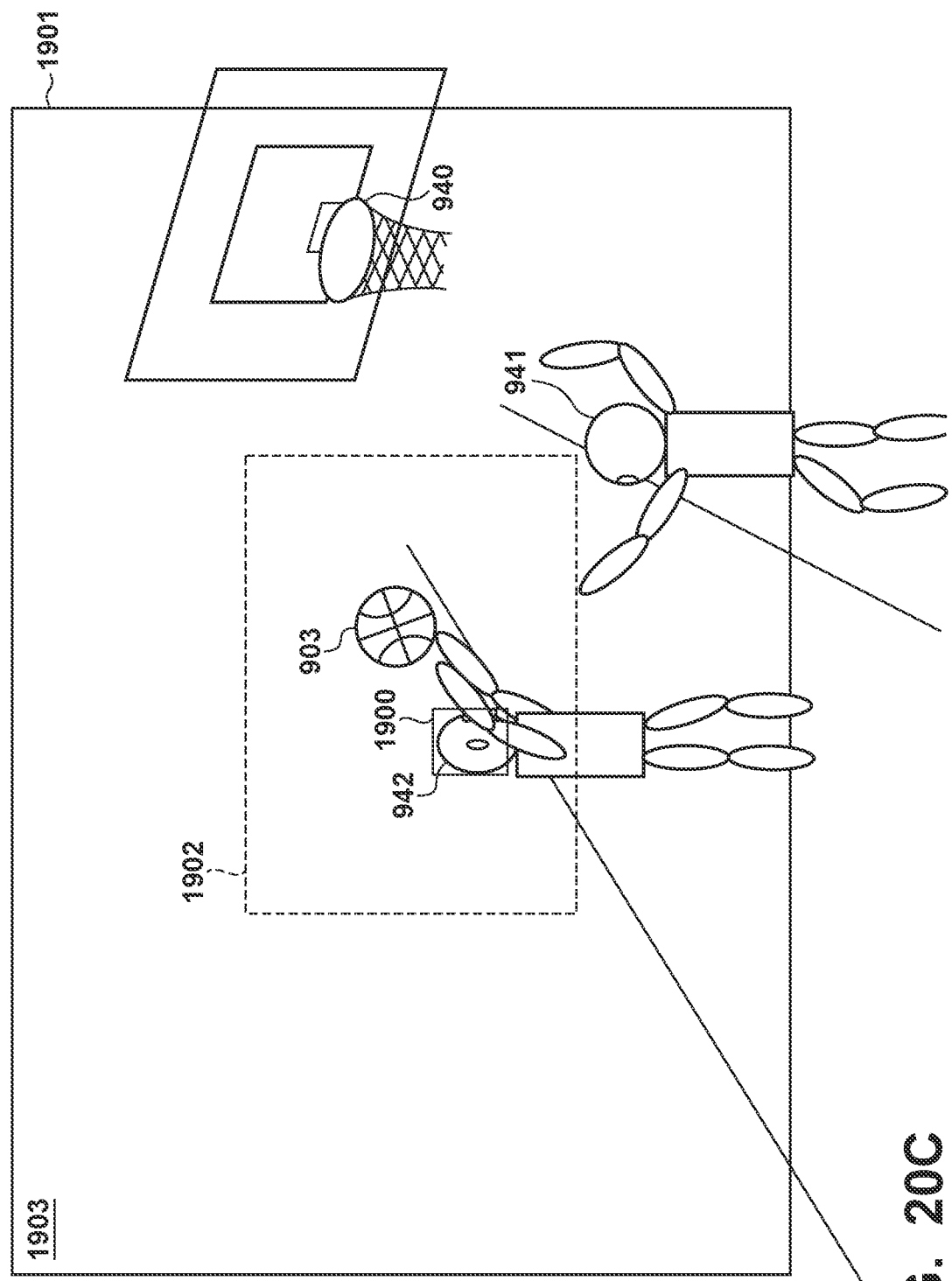
FIG. 20C is a conceptual diagram describing the main object determination process in the second embodiment.

FIG. 20C illustrates a shooting scene of the player 942 switched as the main object in FIG. 20B. The player 942 continues to be the main object in the central image height 1902, and the posture of the player 941 in the peripheral image height 1903 is detected as the main object candidate. Note that the range of the central image height 1902 may be changed according to photographing conditions and object conditions, and switching of the main object may be prioritized according to the posture type of the main object candidate.

In S5007 of FIG. 20, the photographer's intention estimation unit 146 determines an intention of the photographer to intentionally switch the main object on the basis of the camera movement/position information from the main body posture determination unit 145. In a case where it is determined that the main object is switched by the intention of the user, the process proceeds to S5008, and in a case where it is determined that the main object is not switched by the intention of the user, the process proceeds to S4009.

When the main object is switched in S5008, focusing is performed regardless of the defocus amount of the main object, but a focus transition (focus drive control etc.) to the main object may be changed in consideration of responsiveness to the panning/tilting operation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-002558, filed Jan. 11, 2023, which is hereby incorporated by reference herein in its entirety.

What is claimed is:

1. An image capturing apparatus comprising at least one processor or circuit configured to function as:
    an object detection unit configured to detect an object;
    a posture detection unit configured to detect a posture of the object;
    a focus detection unit configured to detect a focusing state of the object;
    a state determination unit configured to determine a state of the object based on a posture of the object; and
    a setting unit configured to set a threshold value for determining whether or not to select the object as a main object based on the state of the object, wherein the threshold value is a threshold value related to the focusing state.

2. The image capturing apparatus according to claim 1, wherein the at least one processor or circuit is configured to further function as
    a focus adjustment unit configured to focus on an object selected as the main object.

3. The image capturing apparatus according to claim 1, wherein the at least one processor or circuit is configured to further function as
    an acquisition unit configured to acquire reliability that the object is a main object based on a posture of the object.

4. The image capturing apparatus according to claim 1, wherein the state determination unit determines a state of what kind of motion the object is performing on a basis of a posture of the object.

5. The image capturing apparatus according to claim 1, wherein the setting unit sets the threshold value further based on a posture duration of the object.

6. The image capturing apparatus according to claim 5, wherein the setting unit sets the threshold value to be larger as the posture duration becomes longer.

7. The image capturing apparatus according to claim 1, wherein the at least one processor or circuit is configured to further function as
    a detection unit configured to detect panning or tilting of the image capturing apparatus.

8. The image capturing apparatus according to claim 7, wherein the at least one processor or circuit is configured to further function as
    a second selecting unit configured to select an object approaching the center of a screen by the panning or tilting as a main object.

9. The image capturing apparatus according to claim 1, wherein the focus detection unit detects a defocus amount as the focus state,
    wherein the threshold value is a threshold value for a defocus amount of the object, and
    wherein the at least one processor or circuit is configured to further function as a selecting unit configured to select the object as the main object in a case where a defocus amount of the object is less than or equal to the threshold value.

10. The image capturing apparatus according to claim 8, wherein the focus detection unit detects a defocus amount as the focus state,
    wherein the threshold value is a threshold value for a defocus amount of the object,
    wherein the second selecting unit selects the object approaching the center of the screen by the panning or tilting as a main object even if the defocus amount of the object is larger than the threshold value.

11. A method of controlling an image capturing apparatus, comprising:
    performing object detection for detecting an object;
    performing posture detection for detecting a posture of the object;
    performing focus detection for detecting a focusing state of the object;
    performing a state detection for determining a state of the object based on a posture of the object; and
    setting a threshold value for determining whether or not to select the object as a main object based on a posture, wherein the threshold value is a threshold value related to the focusing state.

12. A non-transitory computer-readable storage medium storing a program for causing a computer to execute each step of a method for controlling an image capturing apparatus, the method comprising:
    performing object detection for detecting an object;
    performing posture detection for detecting a posture of the object;
    performing focus detection for detecting a focusing state of the object;
    performing a state detection for determining a state of the object based on a posture of the object; and
    setting a threshold value for determining whether or not to select the object as a main object based on a posture, wherein the threshold value is a threshold value related to the focusing state.

13. An image capturing apparatus comprising at least one processor or circuit configured to function as:
    an object detection unit configured to detect an object;
    a posture detection unit configured to detect a posture of the object;
    a focus detection unit configured to detect a focusing state of the object;
    a game determination unit configured to determine a type of game being played by the object based on a posture of the object; and
    a setting unit configured to set a threshold value for determining whether or not to select the object as a main object based on the type of the game, wherein the threshold value is a threshold value related to the focusing state.

14. A method of controlling an image capturing apparatus, comprising:
  performing object detection for detecting an object;
  performing posture detection for detecting a posture of the object;
  performing focus detection for detecting a focusing state of the object;
  performing game determination for determining a type of game being played by the object based on a posture of the object; and
  setting a threshold value for determining whether or not to select the object as a main object based on the type of the game, wherein the threshold value is a threshold value related to the focusing state.

15. A non-transitory computer-readable storage medium storing a program for causing a computer to execute each step of a method for controlling an image capturing apparatus, the method comprising:
  performing object detection for detecting an object;
  performing posture detection for detecting a posture of the object;
  performing focus detection for detecting a focusing state of the object;
  performing game determination for determining a type of game being played by the object based on a posture of the object; and
  setting a threshold value for determining whether or not to select the object as a main object based on the type of the game, wherein the threshold value is a threshold value related to the focusing state.

16. The image pickup apparatus according to claim 13, wherein the focus detection unit detects a defocus amount as the focus state,
  wherein the threshold value is a threshold value for a defocus amount of the object,
  wherein the at least one processor or circuit is configured to further function as a selecting unit configured to select the object as the main object in a case where a defocus amount of the object is less than or equal to the threshold value.

* * * * *